(12) United States Patent
Elfezouaty

(10) Patent No.: US 7,721,888 B2
(45) Date of Patent: May 25, 2010

(54) FLORAL STAND, FRAME KIT AND CONTAINER AND METHOD OF USE

(76) Inventor: Igal R. Elfezouaty, 1450 W. Massey Rd., Memphis, TN (US) 38120-3238

( * ) Notice: Subject to any disclaimer, the term of this patent is extended or adjusted under 35 U.S.C. 154(b) by 366 days.

(21) Appl. No.: 10/536,122

(22) Filed: Feb. 1, 2008

(65) Prior Publication Data

US 2008/0230409 A1    Sep. 25, 2008

Related U.S. Application Data

(60) Provisional application No. 60/898,871, filed on Feb. 1, 2007.

(51) Int. Cl.
  *B65D 85/00* (2006.01)
  *A47G 7/00* (2006.01)
(52) U.S. Cl. .................. 206/423; 47/41.01; 248/27.8
(58) Field of Classification Search ............... 206/223, 206/423; 47/41.01, 41.13; 248/27.8, 146
  See application file for complete search history.

(56) References Cited

U.S. PATENT DOCUMENTS

| | | | | |
|---|---|---|---|---|
| 5,070,644 A | * | 12/1991 | Hasty | 47/41.12 |
| 5,195,270 A | * | 3/1993 | Domurat | 47/41.01 |
| 6,681,519 B2 | * | 1/2004 | Cone | 47/40.5 |
| 2001/0049903 A1 | * | 12/2001 | Gilbert | 47/41.01 |
| 2002/0153457 A1 | * | 10/2002 | Cumby | 248/27.8 |
| 2003/0110685 A1 | * | 6/2003 | Weder | 47/41.01 |
| 2005/0150159 A1 | * | 7/2005 | Weder et al. | 47/41.01 |
| 2006/0283077 A1 | * | 12/2006 | Viviano | 47/41.01 |

* cited by examiner

*Primary Examiner*—Jacob K Ackun, Jr.
(74) *Attorney, Agent, or Firm*—Walker, McKenzie & Walker, P.C.

(57) ABSTRACT

A product packaging container including end caps with reciprocating pins moved by rotating cams that secure a sidewall sheet fabricated of a flexible material capable of receiving ink or laser printing on one surface, and an end cap may include a sound-playing circuit that plays when the pins are actuated to release the sidewall sheet. Embodiments of a frusto-conical floral stand with a nutrient-filled bladder are provided. A frame kit is provided that, when assembled, holds the sidewall sheet of the container therewithin. A method for processing orders and shipping parcels such as horticultural articles in such containers is also provided, and the orders may specify a personalized sound and a personalized message on the sidewall sheet for framing.

5 Claims, 14 Drawing Sheets

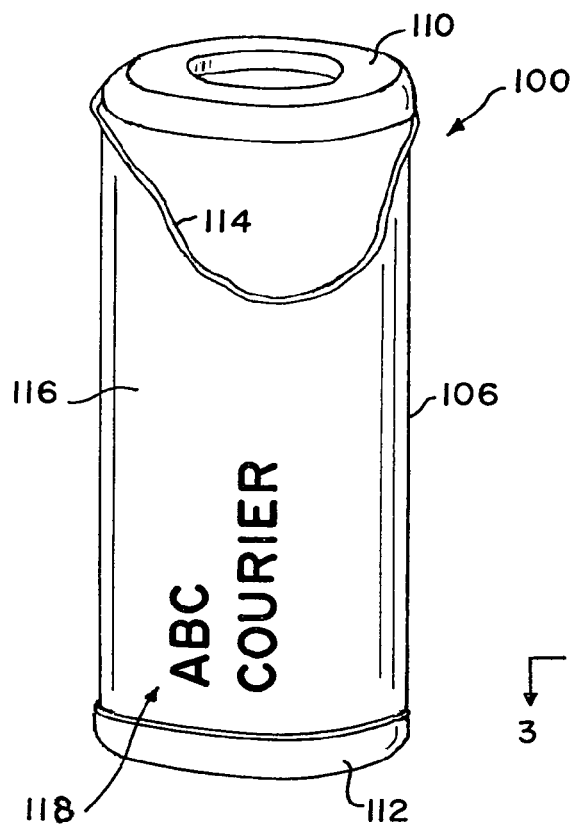
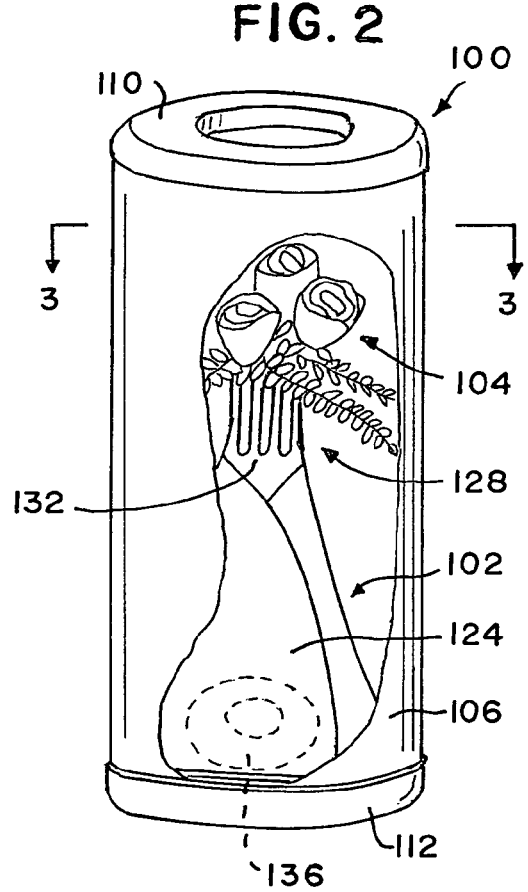
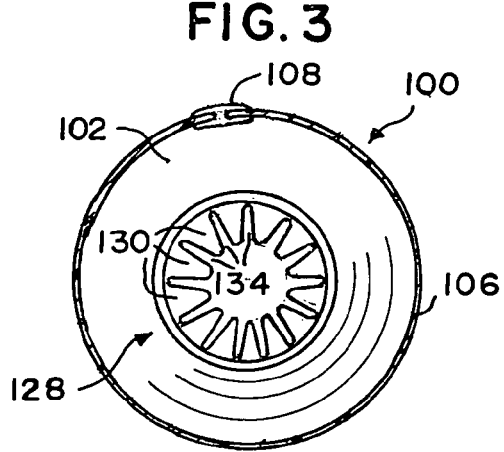

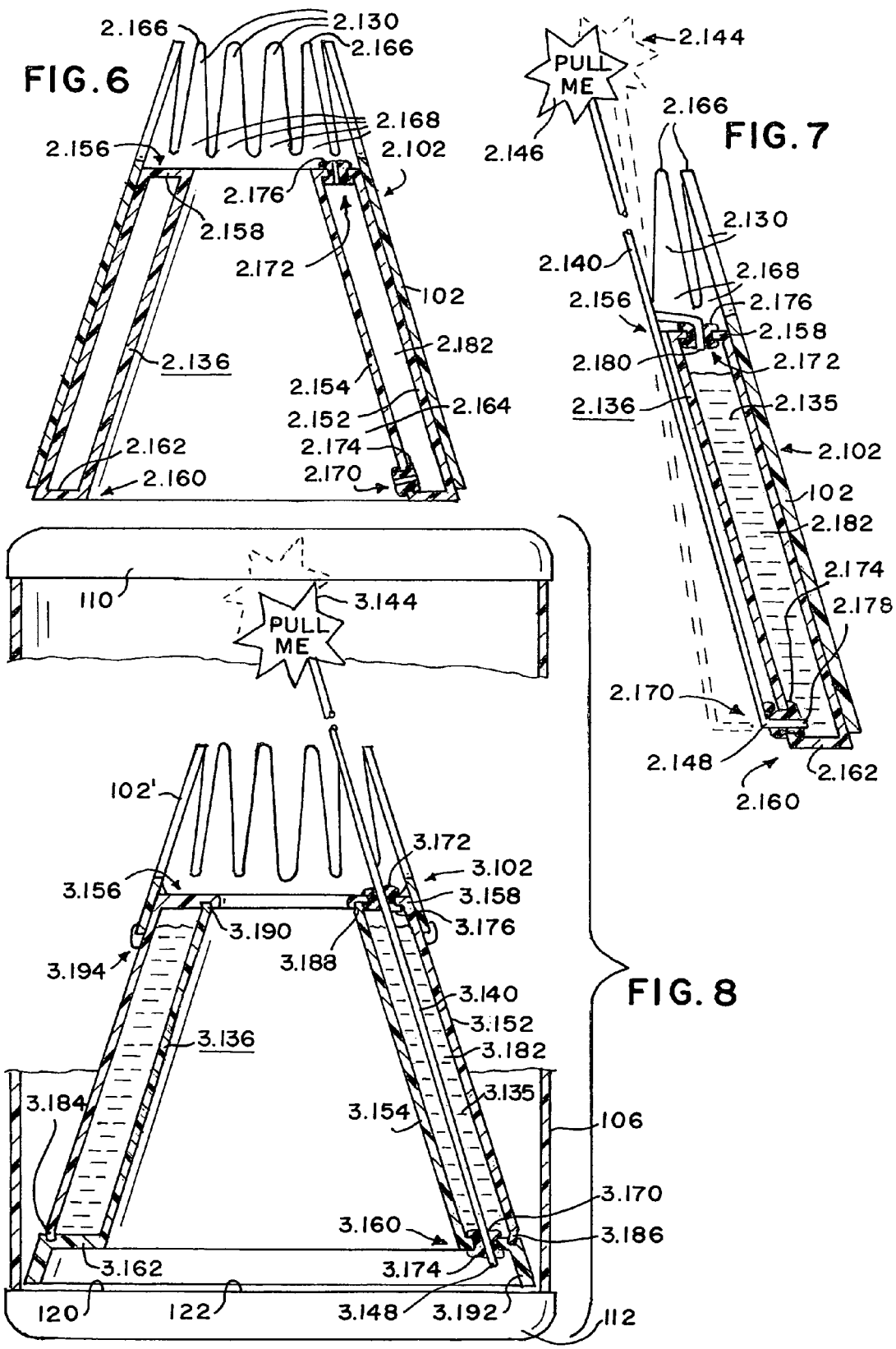

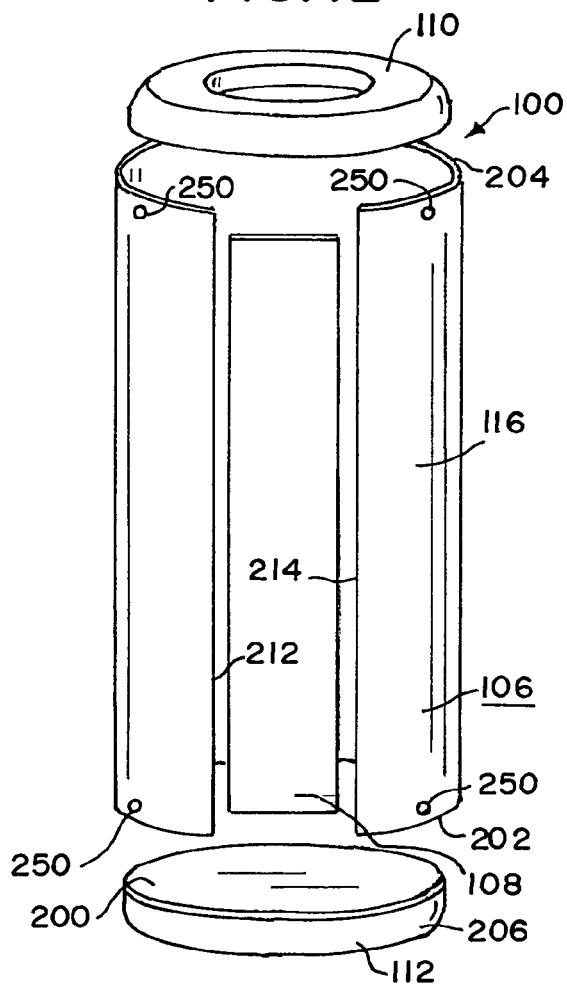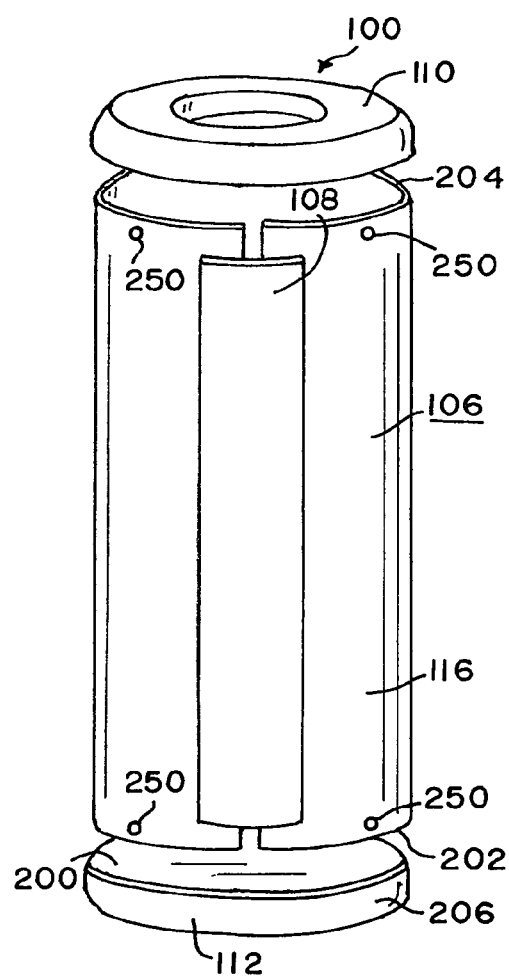

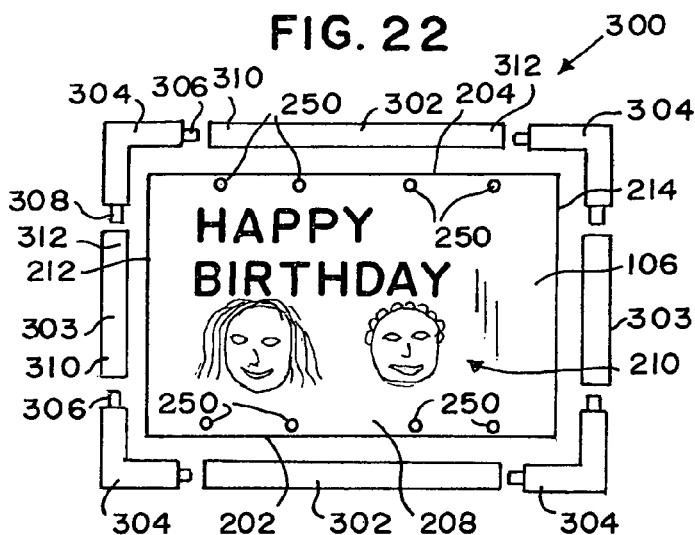
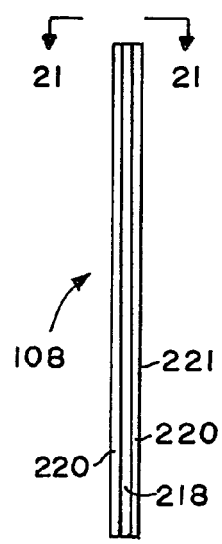
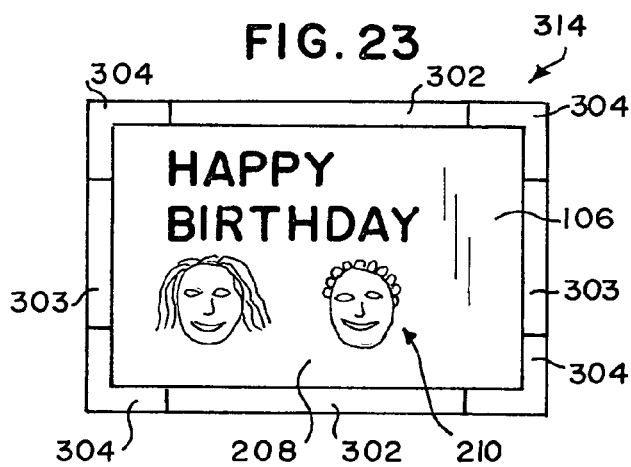
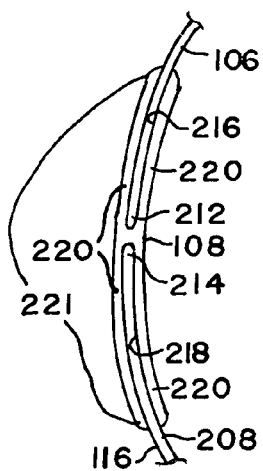

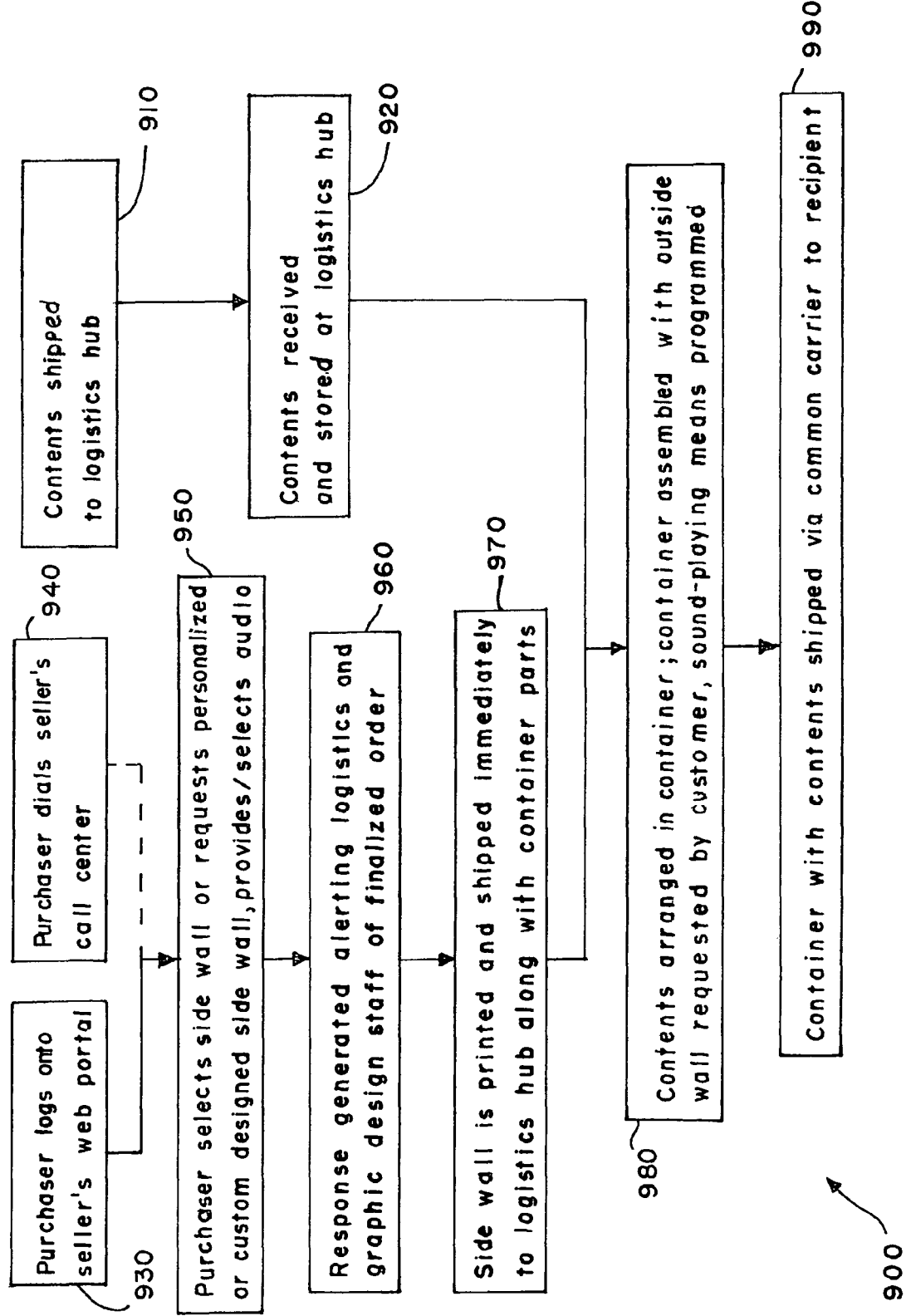

FLORAL STAND, FRAME KIT AND CONTAINER AND METHOD OF USE

CROSS REFERENCE TO RELATED APPLICATIONS

This application is a non-provisional continuation-in-part of pending U.S. Provisional Patent Application No. 60/898,871, filed Feb. 1, 2007, and entitled "Shipping Container and Method of Use", fully included by reference herein, and claims priority benefit thereof.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates generally to a container for packaging and shipping parcels. In addition, the present invention relates generally to methods of ordering, packaging and transporting parcels such as horticultural articles between purchasers and recipients. The present invention especially concerns packaging containers and methods that integrate advantageous and innovative components and techniques in kit form as well as convey a message to the recipient.

2. Information Disclosure Statement

Parcels for shipment may be packaged in a variety of ways. More particularly, gifts such as stuffed animals, flowers, chocolates, jewelry, etc. have conventionally been placed in cardboard boxes by the manufacturer or distributor for shipment to the recipient. In the case of horticultural articles such as flowers, a purchaser may order flowers and have them shipped to their final destination via a major carrier such as Federal Express or DHL in a box provided by the carrier or seller. In some cases, the box may contain not only the gift of flowers but may contain various items such as an expandable vase, flower food and a card that may include a personal message from the purchaser. One major problem with this packaging and method of processing the shipment is that the shipping container may not be designed to provide for the arrival of fresh flowers that are securely held during shipment. That is, flower arrangements may be damaged due to movement during shipping. In some cases, a water-filled block of absorbent floral foam having a plastic liner is secured in an open top cardboard box at the base of a shipping carton. In this assembly, cut flowers puncture the liner in order to obtain the necessary water during delivery. This assembly, however, properly functions only when the box is vertical and water may leak from the punctured liner. The use of a block assembly may also not adequately support the flowers during delivery. Further, the packaging or box itself is typically disposed of by the recipient upon arrival and serves no other function except to attempt to protect the contents of the box during transportation. As such, there exists a need in the logistics art for a shipping container that is not only capable of safely and economically shipping various fresh horticultural articles but can serve a functional purpose for the recipient.

There further exists a need in the art for a method of processing gift orders utilizing such containers. Currently, a purchaser may buy gifts such as flowers by placing an order over the Internet or calling a local florist. The order may be processed and placed in a shipping channel by many different entities or flower brokers without the seller having any control over where, or under what conditions, the flowers are cultivated. One problem associated with this process is that shipping time may be delayed due to the time required to process the order through the various entities or channels. Specifically, the use of multiple entities in the process can result in a longer time between ordering and arrival of the flowers as well as the possible sacrifice of flower freshness. Another problem that arises is one of social responsibility and accountability. That is, without the ability to trace the origin of the flowers, the purchaser is unable to receive a guarantee that the flowers meet any recognized international "fair trade" standard. As such, there exists the need for a method of processing gift orders for items such as flowers that allows for not only quicker and more efficient processing but allow for traceability of the flower's origin. The present invention seeks to fulfill the needs articulated above.

Goetcheus et al., U.S. Pat. No. 5,444,767 (issued Aug. 22, 1995), describes systems and methods for delivering personalized audio messages, whereby a customer provides a personalized audio message as by using a microphone or by using a telephone connection to a central facility computer system, and the personalized audio message is programmed into a portable playback device for later playback by a recipient of the personalized audio message. Such a system may be used for the sound-playing means of the present invention, and to personalize the sound-playing means of the present invention with a personalized audio message.

West, U.S. Pat. No. 6,011,833 (issued Jan. 4, 2000), describes a system for arranging for delivery of a bouquet of flowers with a pre-recorded personalized greeting that may be heard by the recipient upon calling a predetermined telephone number.

Charrin et al., U.S. Pat. No. 6,018,908 (issued Feb. 1, 2000), describes a tapered conical vase for cut flowers that is assembled from a foldable flat sheet-like material with tabs.

Weder et al., U.S. Pat. No. 6,725,600 (issued Apr. 27, 2004), describes a variety of vases for cut flowers, including conical vases, that are assembled from a foldable sheet of material.

Turner et al., U.S. Pat. No. 6,718,013 (issued Apr. 6, 2004), describes an audio recording and playback system that might be suitable for use as the sound-playing means of the present invention to provide the prerecorded audio message of the present invention.

None of these references, either singly or in combination, discloses or suggests the present invention.

BRIEF SUMMARY OF THE INVENTION

A packaging container is provided. In one embodiment, the packaging container is used for shipping fresh cut flower arrangements over long distances, but the container is not limited to the shipping of cut flower arrangements, and the shipping distance need not be great. If the contents are perishable, these distances may take many hours to travel under controlled conditions in an attempt to have perishable goods arrive at their destination in a fresh condition. The container also provides a mechanism for holding flowers in a secure manner, thus allowing for a full, fresh presentation upon arrival. In other embodiments, the container may hold contents other than flowers, and is equally useful for sending gifts and/or novelty items of almost any type to a recipient. In one embodiment, the container comprises opposing end caps, a floral stand, and a sidewall sheet. The end caps are further comprised of a platform, a cam, and a base or cover having a peripheral wall. The sidewall sheet is held together between the end caps in a tubular formation by a connector.

In use, movement of the cam allows spring-loaded pins in the base or cover to engage holes in the sidewall sheet and aligned mating holes in the peripheral wall of the base or cover, thus securing the sidewall sheet within a channel defined by the peripheral wall of the base or cover and platform. Each end cap component is fabricated from of a light, rigid material such as an injection-molded plastic, acrylonitrile butadiene styrene (ABS), or polyethylene (PE). In one embodiment, the sidewall sheet may be made of a flexible material such as roll-extruded ABS that is capable of receiving ink or laser printing on at least one surface. In an alternative embodiment, a standard or personalized image, message or combination thereof is printed on a film and applied directly to a surface of the sidewall sheet. When used to transport flowers to a recipient, the container disclosed herein may also provide a watering means, within a floral stand, that is activated by the recipient upon arrival. In one embodiment, the watering means is a sealed bladder or series of bladders having water, flower nutrients, a flower freshening solution or a combination thereof. The bladder may be fabricated from any material that is light-weight and flexible yet capable of being punctured by a string or line, or in which a removable elongated member opens one or more holes in the bladder when removed, thereby allowing the watering solution to become applied to the flowers, and the bladder may be fabricated from a low-density polyethylene. In other embodiments, the bladder is a part of the floral stand. A wrapping means such as a cellophane sheet may be wrapped around the floral stand, thereby creating a bottom-sealed vase for holding water. Potting means such as moss may be placed within the floral stand to further secure the stems of the flowers. Transportation means such as a string or line may extend from an end cap to allow an individual to pick up and transport the container. The container may also include a greeting card and a frame kit, and sound-playing means may be provided that plays a pre-recorded message when the recipient opens the container.

A method of processing an online gift order is also provided. In one embodiment of the method, the article ordered, shipped and received is a bouquet of flowers. In one step, a merchant computer receives an online order through a web portal from a purchaser. In an alternative embodiment, a purchaser places an order by calling the seller's call center and speaking with a customer service representative. The method also includes the step of the purchaser specifying a standard or personalized image, message or combination thereof that the purchaser would like to have displayed on the inner surface of the container's sidewall sheet. In another step, the merchant processes the order by boxing and shipping freshly picked flowers via a common carrier to a distribution facility or logistics hub located in a centralized geographic location. In one step, the merchant unpacks the flowers at the distribution facility and stores the flowers temporarily in a properly maintained environment. The method may further include the step of providing a shipping container that, in turn, may include the steps of preparing the sidewall sheet as instructed and shipping the sidewall sheets and container parts to the logistics hub. In another step, the container is assembled and the flowers are arranged in the floral stand and placed inside the container. Optionally, the method may include the step of placing a watering means such as a bladder inside the floral stand. In one embodiment, the bladder may contain water, nutrients anti-bacterial product or a combination thereof. In another embodiment, the solution within the bladder may be frozen. The method further includes the step of shipping the flowers in the assembled container via a common carrier. The entire method is performed by the seller within a timeframe that allows the flowers to arrive at the recipient's home or place of business while still in a fresh condition. The entire process including flower cultivation and order processing may be conducted in accordance with various international fair trade practices.

It is an object of one embodiment of the present invention to provide a floral stand within a container for transporting cut flowers to a recipient, and to provide a bladder that may release nutrient liquid therefrom to nourish the flowers once they reach the recipient. It is a further object of the present invention to provide a frame kit as a part of the container, whereby the wall of the container provides a sheet image that can be assembled within the frame kit provided within the container. It is a further object of the present invention to provide a protective container for shipping contents to a recipient, including sound-playing means for providing a pre-recorded audio message to the recipient upon opening of the container, and a system for ordering the contents and providing the pre-recorded message during the ordering process. In some embodiments, the contents in the container may be cut flowers.

BRIEF DESCRIPTION OF THE SEVERAL VIEWS OF THE DRAWING

So that the above-recited features of the present inventions can be better understood, certain drawings and/or flow charts are appended hereto. It is to be noted, however, that the appended drawings illustrate only selected embodiments of the inventions and are therefore not to be considered limiting of scope, for the inventions may admit to other equally effective embodiments and applications.

FIG. 1 is a perspective side view of one embodiment of the shipping container.

FIG. 2 is a cut-away side view of the shipping container of FIG. 1, showing a flower bouquet secured within a floral stand.

FIG. 3 is a cross-sectional view of the container taken along the line 3-3 shown in FIG. 2, with flowers and wrapping removed for clarity.

FIG. 6 is a side sectional view of a second embodiment of the floral stand of the present invention.

FIG. 7 is a side sectional view of a portion of the second embodiment of the floral stand of the present invention, showing removal of a first embodiment of the elongated member.

FIG. 8 is a side sectional view of a third embodiment of the floral stand of the present invention, showing removal of a second embodiment of the elongated member and showing the elongated member being held in place by the top of the shipping container.

FIG. 12 is a side view of the container of FIG. 1 showing how the sidewall sheet is rolled and sealed together via a connector.

FIG. 13 is a side view of the container of FIG. 1 showing the sidewall sheet in a sealed position via the connector.

FIG. 16 is a top view of an end cap of the present invention, showing movement of the cam.

FIG. 17 is a bottom view of an end cap of the present invention, showing location of the speaker holes of the sound-playing means.

FIG. 18 is a plan view of the platform and cam of the end cap of the present invention with the base or cover removed, showing the mounting of the sound-playing means.

FIG. 19 is a plan view of the base or cover of the end cap of the present invention with the platform and cam removed, showing the spring-loaded pins that engage the cam.

FIG. 20 is a side view of the connector shown in FIGS. 12 and 13.

FIG. 21 is a top view of the connector shown in FIG. 20, taken substantially along the line 21-21, showing holding of the edges of the sidewall sheet by the connector.

FIG. 22 is a front view of an unrolled sidewall sheet with pieces of a frame kit of the present invention shown around the perimeter of the sidewall sheet.

FIG. 23 is a front view of the unrolled sidewall sheet secured within the frame kit.

FIG. 35 presents an overview of one embodiment of a method of processing an order for contents shipped in the container of the present invention.

DETAILED DESCRIPTION OF THE INVENTION

Figure 4:
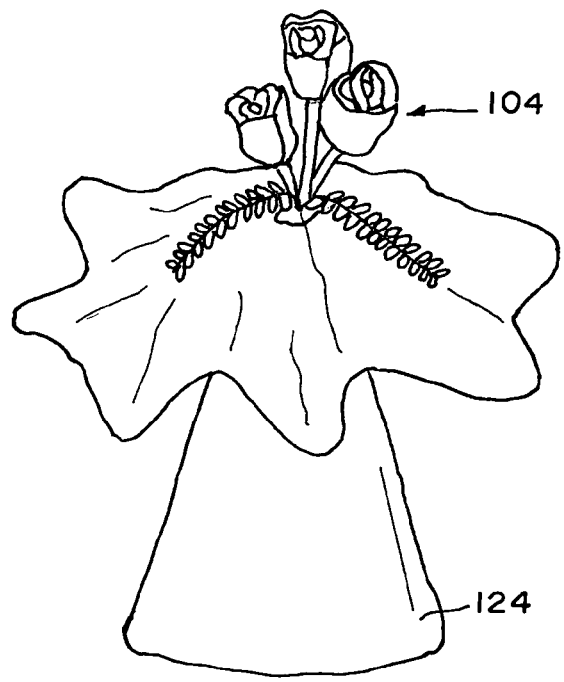
FIG. 4 is a side elevation view of the floral stand of the present invention with flowers inserted and wrapping therearound.

Referring to FIGS. 1-34, the present invention is seen to include a shipping container 100 with a generally frustoconical floral stand 102 therein, with floral stand 102 having a bouquet of cut flowers 104 held therein for shipment.

The shipping container includes a flexible rectangular sheet 106 rolled into a cylinder or tube to form a sidewall of the container, an elongated connector 108 that secures sheet 106 in a generally tubular configuration as hereinafter described in greater detail, and container 100 includes top and bottom circular-shaped caps 110, 112 that generally seal the top and bottom of the container 100. It shall be understood that top and bottom caps 110, 112 are preferably substantially similar, and a description of either will suffice for both.

In one embodiment, the container 100 has a height of approximately 35 centimeters (13.8 inches) and diameter of 16 centimeters (6.3 inches). It is noted that the overall dimensions and shape of the container 100 may vary so as accommodate various sized bouquets of flowers or other gifts. A transportation or carrying means 114 such as a standard string or strong line may be attached to top end cap 110 to allow for pick up and transportation of the container 100. In one embodiment, the exterior surface 116 of the sheet 106 may be imprinted with the trademark 118 of the shipping company, as best seen in FIG. 1. Alternately or additionally, the exterior surface 116 of the sheet 106 may display the trademark of the seller, or a decorative design to be presented to the recipient.

Figure 5:
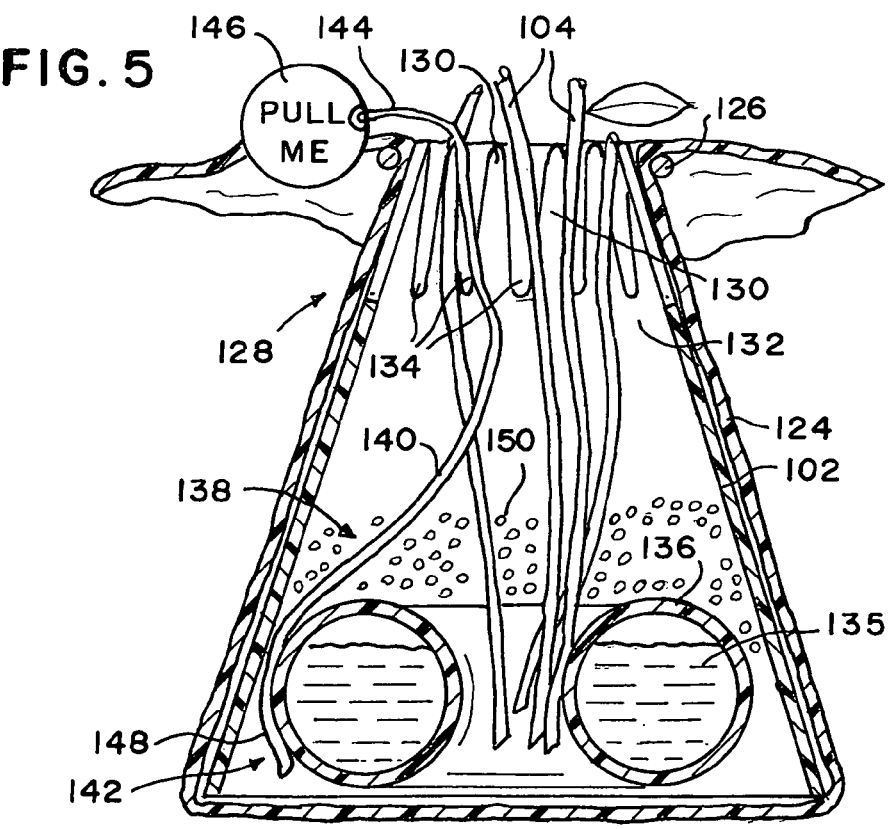
FIG. 5 is a side sectional view of a first embodiment of the floral stand and vase of the present invention.

FIG. 2 is a cut-away side view of the shipping container 100 of FIG. 1. In the illustrated embodiment shown in FIGS. 2 and 3, a frustoconical-shaped floral stand 102 sits on a preferably flat top surface 120 of a platform 122 (see, e.g., FIGS. 8 and 17) that is engaged within the bottom end cap 112 and which supports floral stand 102. As illustrated in the preferred embodiments shown in FIGS. 5-9, floral stand 102 preferably has an open bottom, and a surrounding sheet or wrapping 124 of decorative cellophane, preferably tied around the neck of the floral stand 102 by a string or well-known zip tie 126, as best seen in FIG. 5, thereby providing a pleasing presentation of the flowers 104 in the floral stand 102 while also sealing the bottom of the floral stand 102 and thereby creating a sealed-bottom vase that holds liquid 135, such as water and nutrients, therewithin for sustenance of the flowers 104. However, without departing from the scope of the present invention, the floral stand 102 may alternatively be provided with a closed bottom such that the liquid 135 is held within the floral stand 102 without requiring sealing by wrapping 124. The structure of floral stand 102 allows a plurality of cut flowers 104 to extend upwardly through an upper end 128, thus displaying a pre-arranged bouquet in a full or global presentation. A full presentation is accomplished through the use of a plurality of tabs or spaced-apart fingers 130 along a peripheral top edge 132. The tabs or spaced-apart fingers 130 form slots 134 therebetween capable of receiving flower stems. In use, the seller arranges the flowers according to the length of the flower's stem. Specifically, flowers arranged in the center portion of the upper end 128 have stems that are shorter than those placed along the peripheral edge 132 within the slots 134. By having varying lengths and the slots 134 to receive the longer stems, the bouquet gives a full presentation. In a preferred embodiment, the seller may hand tie these flowers in a "twist" bouquet before placing the stems within the floral stand.

In the illustrated embodiments, the floral stand 102 preferably includes a watering means such as a bladder filled with a liquid 135 such as water, nutrients, anti-bacterial product or a combination thereof in sufficient quantity to enhance the shelf life of the flowers. In a first embodiment, the watering means is a donut-shaped bladder 136. The donut-shaped bladder 136 may be fabricated from any material that is light weight and flexible yet capable of being punctured or tearingly ruptured by a string or line such that the liquid contents of the bladder may be released to nourish the flowers. In a first embodiment best seen in FIG. 5, and received within the floral stand 102, the donut-shaped bladder 136 is fabricated from a low density polyethylene. A bladder contents releasing means 138, preferably such as a string or line 140, may be attached to a portion 142 of the water bladder 136 as by gluing, heat sealing, or by molding string or line 140 into or onto the wall of the bladder 136 in a manner that will now be apparent to those skilled in the art, or by wrapping the end of string 140 around the bladder 136. During packing and assembly of the container 100, a first end 144 of the string 140 may be left conspicuously outside of the floral stand 102, preferably with an instruction tag 146 attached thereto instructing the recipient to pull the string 140 to cause release of the liquid contents from the bladder 136. The opposing end 148 of string 140 is securely attached to or wrapped around the bladder 136, thus permitting the liquid contents 135 of the bladder 136 to be released by the recipient in a manner that can now be explained.

In use, the recipient pulls the first end 146 of the string 140, thereby tearing or puncturing the donut-shaped bladder 136 as the string 140 tears the wall of bladder 136, thereby allowing the liquid 135 to be released within the bottom of the floral stand 102, thereby thus re-hydrating the flowers 104. In an alternative embodiment, the floral stand 102 may contain a plurality of bladders 136 whose contents each are capable of being independently released over a period of time to maintain flower quality. Experimental testing of a prototype of the present invention has shown that donut-shaped bladder 136 tends to become pulled upwardly into the stems of flowers 104 toward the upper portion 128 of floral stand 102 and away from the bottom of the floral stand 102 as string 140 is pulled by the recipient, causing this embodiment of bladder 136 to be less preferable than the embodiments shown in FIGS. 6-9, hereinafter described in detail.

In the various embodiments of the floral stand 102 of the present invention, preferably at least one sheet of wrapping 124 surrounds the floral stand 102. The wrapping 124 may be any water-impermeable material such as cellophane or coated paper. The wrapping 124 forms a seal around the bottom of floral stand 102, thereby creating a sealed-bottom vase, thus allowing any released liquid 135 to be contained within the floral stand 102 around the stems of the bouquet for sustenance of the flowers 104. A securing means such as a string or well-known zip tie 126 is preferably strapped around the floral stand just below the slots 134 to secure the wrapping 124. By including the bladder 136 within the floral stand, the prior art need for the flower recipient to arrange the flowers and mix added water with a nutrient supplement is eliminated. In extreme heat conditions it is possible to freeze the bladder 136 and its contents before assembly of the container 100 to assist in keeping the flowers cool during transit. The floral stand 102 may also contain well-known potting means 150 such as moss to secure the flowers 104 within the floral stand 102.

FIGS. 6-9 show alternate embodiments of bladder 136 and floral stand 102. Identifying reference designators for these embodiments are marked similarly to the first embodiments of bladder 136 and floral stand 102 heretofore described, except with prefixes "2." and "3." It shall be understood that many aspects of all embodiments are substantially the same, and only differences will be treated in detail, it being understood that similar structural features of the various embodiments perform similar functions. It shall be understood that wrapping 124 and flowers 104 have been omitted from FIGS. 6-9 for clarity, but will preferably be present as heretofore described for the first embodiments.

Figure 9:
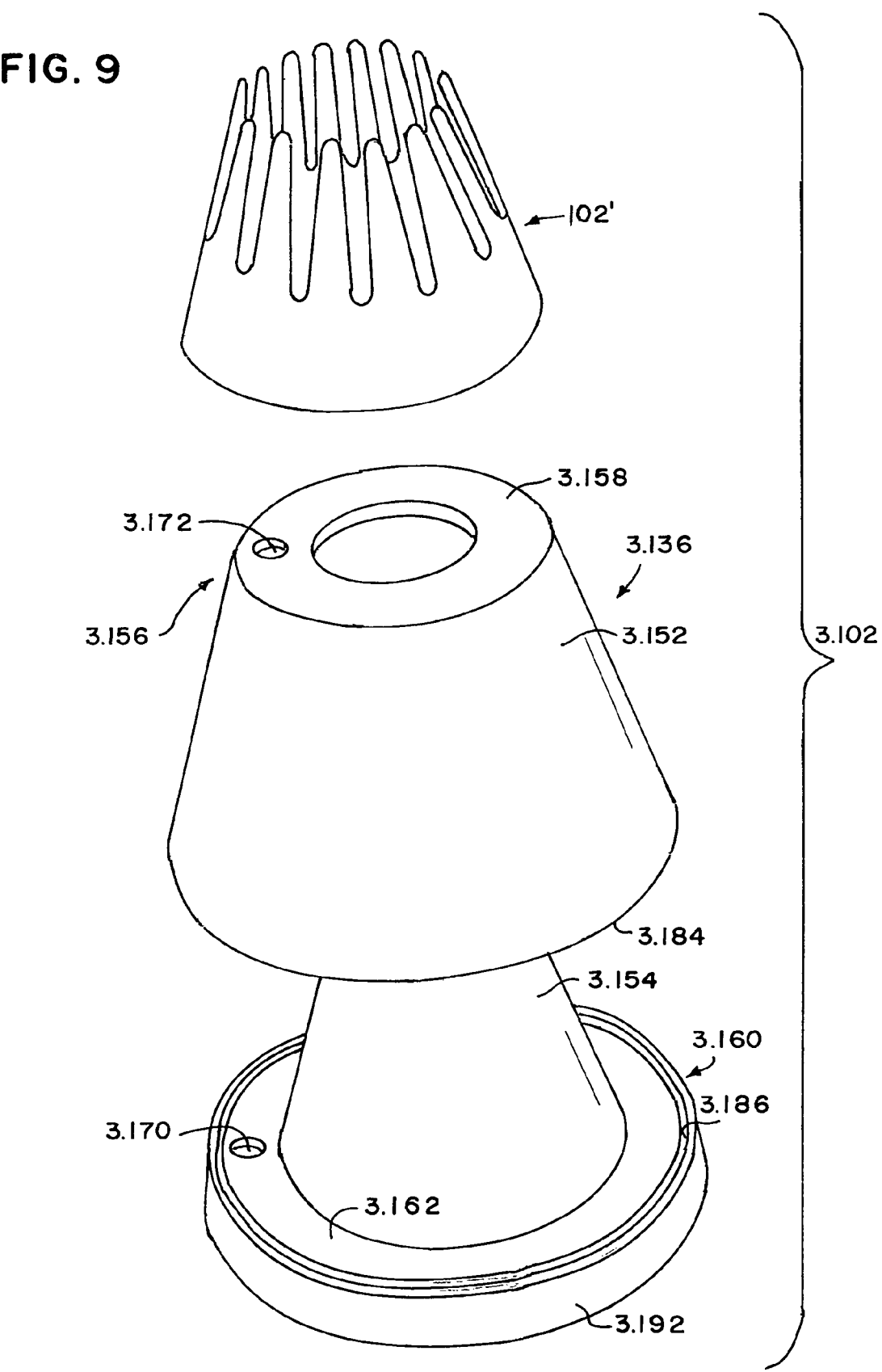
FIG. 9 is an exploded perspective view of the third embodiment of the floral stand of the present invention, showing the parts thereof.

FIGS. 6 and 7 show a second embodiment 2.136 of the bladder being used with the floral stand, and FIGS. 8 and 9 show a third embodiment 3.136 of the bladder being used. Bladder embodiments 2.136 and 3.136, hereinafter described in detail, are similar and differ only in the manner in which the liquid contents of the bladder are released. FIGS. 6 and 7 show a second embodiment 2.102 of the floral stand. FIGS. 8 and 9 also show an alternate embodiment 3.102 of the floral stand, hereinafter described, in which the fingers of a truncated floral stand shell are mounted atop the bladder 3.136, it being understood that alternate embodiment of the floral stand shown in FIGS. 8 and 9, with fingers of the floral stand being mounted atop the bladder, is equally applicable with bladder embodiment 2.136 shown in FIGS. 6 and 7.

Turning to the second embodiment 2.102 of the floral stand with the second embodiment 2.136 of the bladder shown in FIGS. 6 and 7, the floral stand 2.102 is seen to include a frusto-conical bladder 2.136 with bladder 2.136 comprising an outer frusto-conical wall 2.152 and an inner wall 2.154, preferably also frusto-conical as shown, with outer wall 2.152 being spaced from inner wall 2.154. Inner wall 2.154 is sealed as by gluing or welding or melting to outer wall 2.152 at an upper portion 2.156 of bladder 2.136 by a first annulus 2.158 and is sealed as by gluing or welding or melting to outer wall 2.152 at a lower portion 2.160 of bladder 2.136 by a second annulus 2.162, and inner wall 2.154 surrounds a volume 2.164 for receipt of the stems of flowers 104 in a manner similar to that shown in FIG. 5 for the earlier-described embodiment 102 of the floral stand.

As with the first embodiment 102 of the floral stand, floral stand 2.102 has a plurality of spaced-apart fingers 2.130 proximate the upper portion 2.156 of bladder 2.136 and extending upwardly therefrom, with each finger 2.130 having a distal tip 2.166 and having a base 2.168, with the distal tips 2.166 of fingers 2.130 preferably being mutually closer together, because of the inward-angled direction of tips 2.166, than are the bases 2.168 of fingers 2.130, as best seen in FIG. 6. The embodiment 2.102 of the floral stand shown in FIGS. 6 and 7 has an outer shell 102, substantially identical to floral stand 102 shown in FIG. 5, with frusto-conical bladder 2.136 being adapted for closely receiving shell 102 onto and atop of bladder 2.136 as shown to form floral stand 2.102 with bladder 2.136. If desired, shell 102 may be glued or welded to bladder 2.136.

Bladder 2.136 of floral stand 2.102 has a first hole 2.170 proximate the lower portion 2.160 of bladder 2.136, and has a second hole 2.172 proximate upper portion 2.156 of bladder 2.136 and through first annulus 2.158. First and second holes 2.170, 2.172 have well-known first and second grommets 2.174, 2.176 respectively received therein, with grommets preferably being constructed of a resilient sealing material such as rubber. Floral stand 2.102 is preferably provided with an elongated member 2.140 extending from above floral stand 2.102 and removably sealing first hole 2.170. Elongated member 2.140 is preferably constructed of a substantially rigid material such as plastic, and has a first end 2.144 with an instructional message 2.146 thereupon, instructing the recipient to pull or remove the member 2.140 to cause release of the nutrient liquid 2.135 from within the bladder 2.136 in a manner hereinafter described. Elongated member 2.140 has a second end 2.148 with a first finger 2.178 extending from the body of elongated member 2.140 adjacent second end 2.148, and elongated member 2.140 further has a second finger 2.180 extending from the body of elongated member 2.140 intermediate first and second ends 2.144, 2.148. After bladder 2.136 has been filled with nutrient liquid 2.135, second finger 2.180 of elongated member 2.140 is inserted through second grommet 2.176, thereby removably sealing second hole 2.172, and then first finger 2.178 of elongated member 2.140 is inserted through first grommet 2.174, thereby sealing first hole 2.170 of bladder 2.136 and retaining nutrient liquid 2.135 within bladder interior 2.182 defined by inner wall 2.154, outer wall 2.152, first annulus 2.158, and second annulus 2.162. When the recipient receives the floral stand 2.102, the recipient removes the elongated member 2.140 as by rocking it into a vertical orientation as shown in dotted outline in FIG. 7, causing first finger 2.178 to be removed from first hole 2.170 and first grommet 2.174, thereby releasing nutrient liquid 2.135 from within bladder interior 2.182 through first grommet 2.174 and first hole 2.170 into the vase formed by the wrapping around floral stand 2.102 as heretofore described. The recipient then pulls the elongated member 2.140 upwardly to remove it from the floral stand 2.102.

Turning to FIGS. 8 and 9, the third embodiment 3.102 of the floral stand, with third embodiment 3.136 of the bladder, can be described. There are many similarities of these embodiments with the embodiments previously described, and only the differences will be described in detail.

Frusto-conical bladder 3.136 comprises an outer frusto-conical wall 3.152 moldedly formed with a first annulus 3.158 at an upper portion 3.156 of bladder 3.136, and an inner wall 3.154, preferably also frusto-conical as shown, moldedly formed with a second annulus 3.162 adjacent a lower portion 3.160 of bladder 3.136. A lower rim 3.184 of outer wall 3.152 is received into and sealed to a circular recess 3.186 within second annulus 3.162, and an upper rim 3.188 of inner wall 3.154 is received into and sealed to a circular recess 3.190 within first annulus 3.158, with outer wall 3.152 being spaced from inner wall 3.154 when bladder 3.136 is assembled. Once assembled, rim 3.184 is sealed to second annulus 3.162, and rim 3.188 is sealed to first annulus 3.158, as by welding, gluing, or melting, thereby forming bladder interior 3.182 for holding nutrient liquid 3.135. In a difference from the second embodiment 2.136 of the bladder, the third embodiment 3.136 of the bladder has a supporting wall 3.192 that extends downwardly from second annulus 3.162 to cause second annulus 3.162 to be spaced slightly from the surface 120 of platform 122 upon which floral stand 3.102 rests. As with second embodiment 2.102 of the floral stand, second grommet 3.176 is received within a second hole 3.172 within first annulus 3.158. In a difference from second embodiment 2.102 of the floral stand, first grommet 3.174 is received within a first hole 3.170 within second annulus 3.162 but still adjacent a lower portion 3.160 of bladder 3.136, with first and second holes 3.170, 3.172 being aligned so as to have a substantially common axis. This structure allows elongated member 3.140 to be a generally straight member removably inserted through first and second holes 3.170, 3.172 and through first and second grommets 3.174, 3.176, and allows for simpler removal of elongated member 3.140 by simply pulling vertically on elongated member 3.140 as shown in dotted outline in FIG. 8. Supporting wall 3.192 allows the second end 3.148 of elongated member 3.140 to extend through first hole 3.170 and first grommet 3.174 to retain nutrient liquid 3.135 within the bladder 3.136 until released by the recipient. As shown in FIG. 8, elongated member 3.140 preferably has a length so that the first end 3.144 of elongated member 3.140 contacts the underside of top cap 110 of the container when the container is assembled, in a manner hereinafter described, thereby ensuring that elongated member 3.140 continues to seal bladder 3.136 while the container is closed and until the recipient decides to release the nutrient liquid 3.135 from within the bladder.

In a difference from the second embodiment 2.102 of the floral stand, the frusto-conical shell 102' of the third embodiment 3.102 of the floral stand is still received onto the bladder adjacent the outer wall 3.152 but is a shortened and truncated version of the shell 102 used in the second embodiment, and is glued or welded or meltingly attached as at attachment region 3.194 to the upper portion 3.156 of the bladder 3.136 as best seen in FIG. 8. Again, and as previously noted, the truncated floral stand shell 102' shown in FIGS. 8 and 9 is equally applicable with bladder embodiment 2.136 shown in FIGS. 6 and 7.

Turning to FIGS. 1-3 and FIGS. 11-21, additional structure of the container 100 and top and bottom end caps 110, 112 of the present invention can now be described in greater detail. As previously noted, top and bottom caps 110, 112 are substantially similar, and a description of either will suffice for both, and the mating of sheet 106 with top and bottom caps 110, 112 is similar, so, likewise, a description of either will suffice for both.

When container 100 is to be shipped holding flowers, floral stand 102 sits atop bottom end cap 112 within container 100 as best seen in FIGS. 3 and 8. The outside base circumference of the floral stand 102 is such that it is slightly smaller than the outside circumference of the bottom end cap 112, as best seen in FIGS. 3 and 8, thereby preventing movement of floral stand 102 when it is packed inside container 100 for transit. In the illustrated embodiment, a longitudinally-extending circumferential channel 200 around cap 112 is adapted for receipt of the bottom edge 202 of sheet 106, and is defined by the circumferential peripheral wall 206 of the end cap 112 (or, similarly, wall 206' of end cap 110' and wall 206 of end cap 110) and the outer circumference of platform 122. The circumferential channel 200 is adapted for receiving, and does receive, the bottom edge 202 of sheet 106 of the container 100 when the sheet 106 is in a rolled orientation (see FIGS. 8, 11, 12, and 13). Likewise, top edge 204 of sheet 106 is received into a similar circumferential channel 200 in top end cap 110 (and similarly, channel 200 in alternate embodiment end cap 110' shown in FIGS. 14 and 15).

Figure 11:
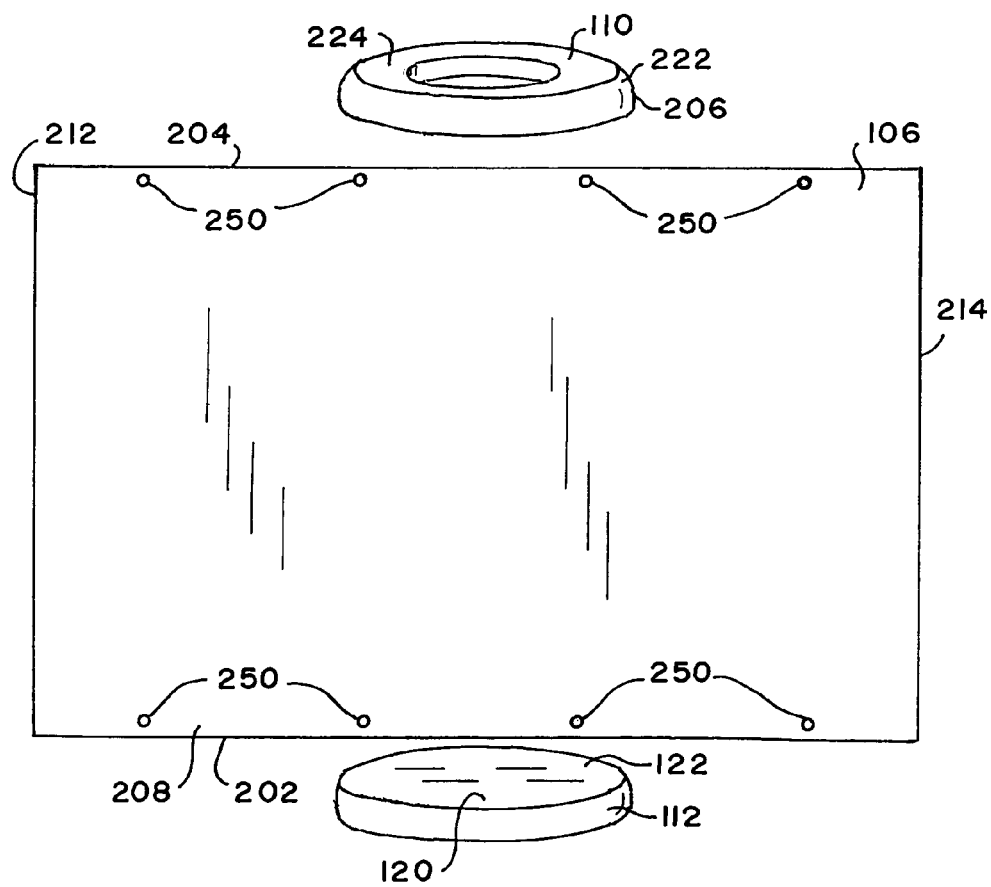
FIG. 11 is a side view of the container of FIG. 1 with the sidewall sheet unrolled showing the interior surface of the sidewall sheet.

FIG. 11 is a side view of the container 100 of FIG. 1 with the sidewall sheet 106 unrolled and exposing an interior surface 208. The interior surface 208 is capable of displaying a printed personalized message 210 and/or a selected image or graphic or original art, or a combination thereof, as best seen in FIGS. 22 and 23, selected by the sender for presentation to the recipient of the container. In the illustrated embodiment, the length of the sidewall sheet 106 is approximately 50 centimeters (20 inches). FIG. 12 is a side view of the container 100 of FIG. 1 showing how the sidewall sheet 106 is rolled and sealed together via a connector 108. FIG. 13 is a side view of the container 100 of FIG. 1 showing the sidewall sheet 106 in a sealed position via the connector 108, and FIG. 21 is a top view, taken substantially along the line 21-21 shown in FIG. 20, showing how, when sheet 106 is rolled into a substantially tubular or cylindrical shape, the left and right edges 212, 214 are received into and secured by the left and right side channels 216, 218 of connector 108, which are respectively formed on connector 108 between a pair of flanges 220 on each elongated side 221 of the connector 108.

The connector 108 may be made from roll-extruded rigid material such as acrylonitrile butadiene styrene (ABS). The length of the connector 108 is slightly less than the height of the sidewall sheet 106 thus allowing the sidewall sheet 106 to engage the channel 200 defined by the peripheral walls 206 of the end caps 110, 112 and platform 122 without interference from connector 108 (see FIGS. 12 and 13).

Figure 14:
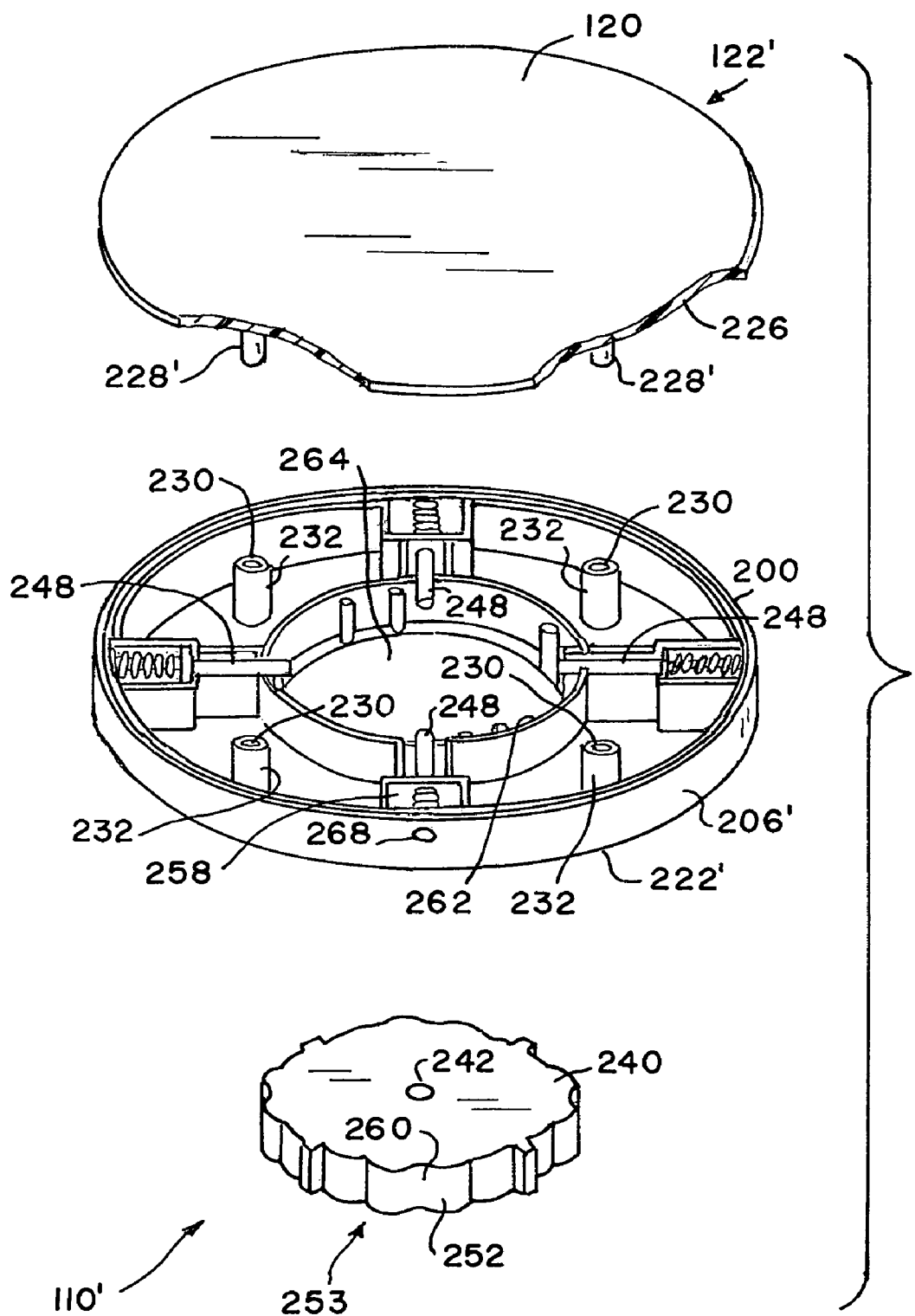
FIG. 14 is an exploded perspective view of an alternate embodiment of one end cap of the shipping container of FIG. 1 showing the platform, base or cover, and cam, with some portions of the platform being cut away to show hidden detail.
Figure 15:
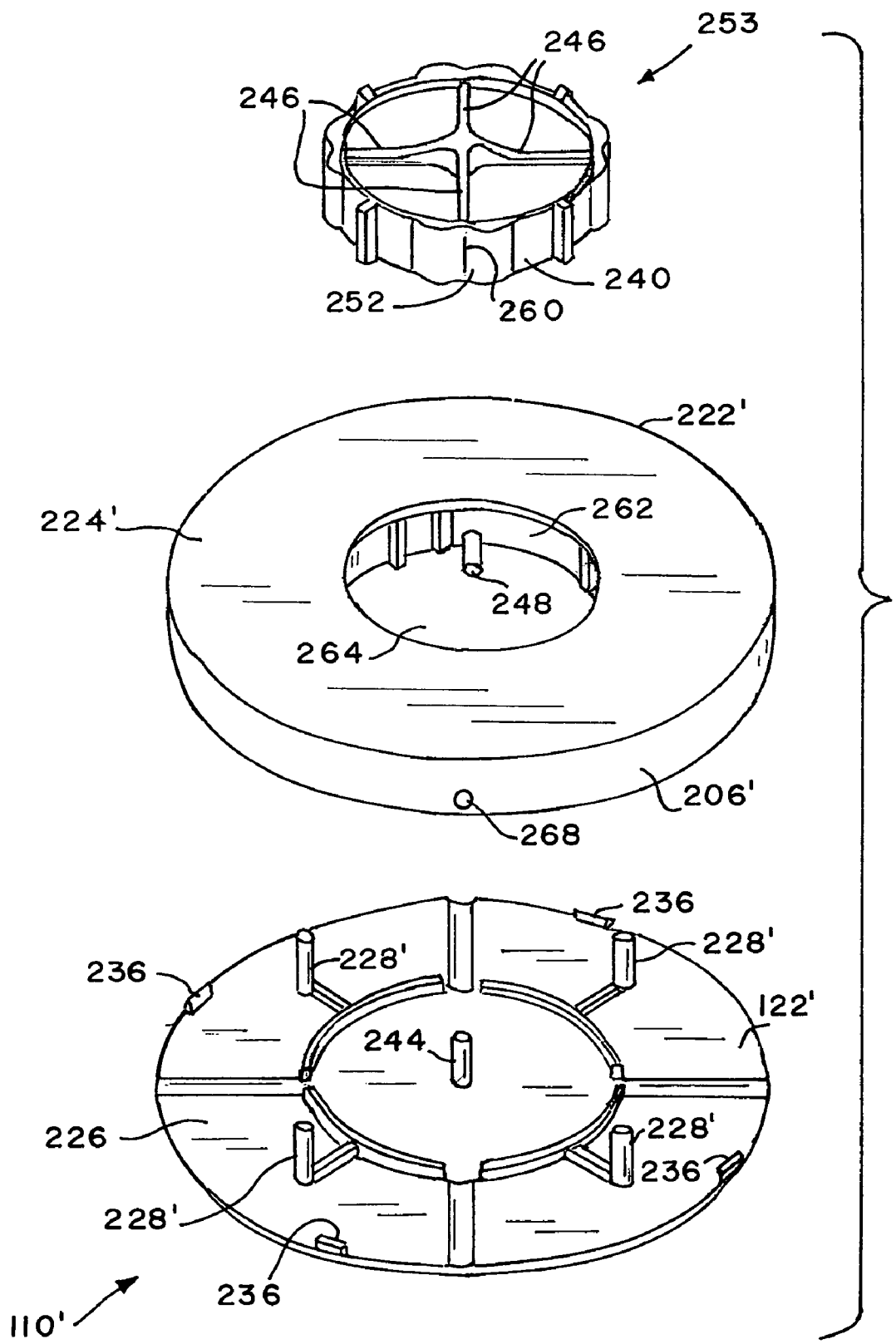
FIG. 15 is an opposing exploded perspective view of the alternate embodiment end cap of FIG. 14 showing a different view of the platform, base or cover, and cam.
Figure 16:
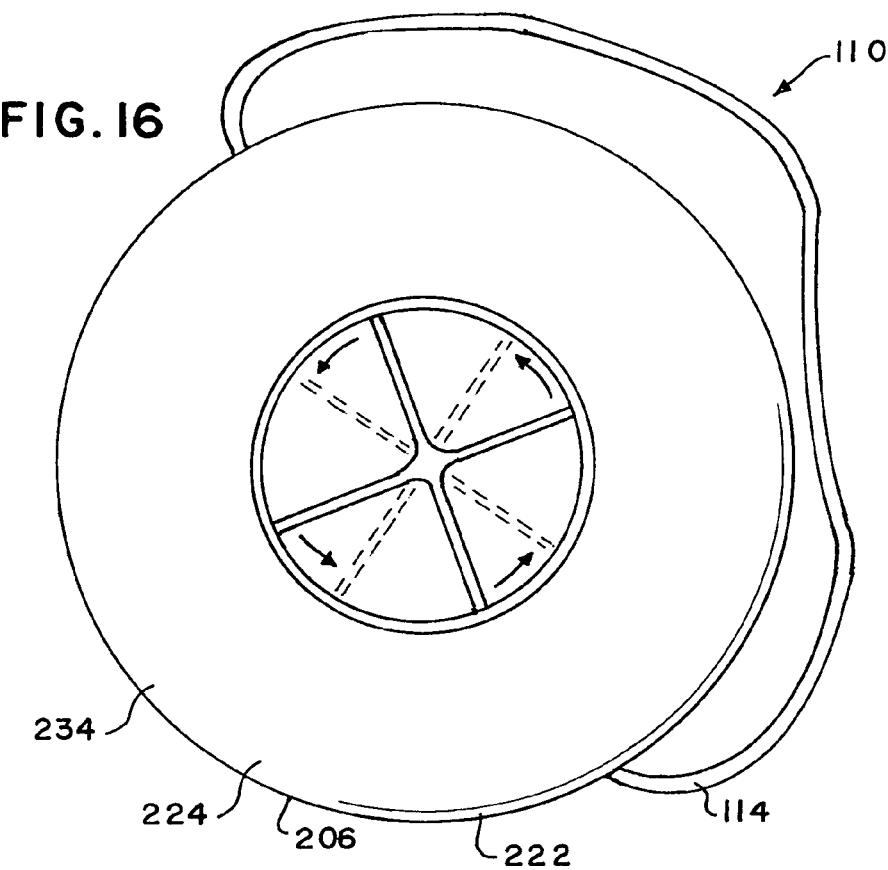
FIGS. 16-19 show details of another embodiment of an end cap of the present invention.

Referring to FIGS. 14-19 and FIG. 10, the top and bottom end caps 110, 112 can now be described in detail. As previously noted, top and bottom end caps 110, 112 are substantially similar, and a description of either will suffice for both. FIGS. 14 and 15 show a alternate embodiment 110' of end cap 110, while the other figures show a more preferred embodiment 110 of the end cap. Because of the previously-noted similarity of the top and bottom end caps, alternate embodiment end cap 110' is suitable for use as either the top or bottom end cap of the present invention. Alternate embodiment end cap 110' shown in FIGS. 14 and 15 is substantially similar to end cap embodiment 110 except in two respects. Specifically, as the first difference, the exposed edge 222' of end cap 110' is a sharp edge where peripheral wall 206' meets end surface 224', whereas, for a more pleasing appearance, the exposed edge 222 of end cap 110 is a rounded edge 222 where peripheral wall 206 meets end surface 224 (see also FIG. 11). As the second difference, opposing surface 226 of platform 122' of end cap 110' has a plurality of longitudinally-extending poles 228' that are matingly received into opposing apertures or bores 230 of raised posts 232 that extend from the base or cover 234, with a plurality of snap tabs 236 engaging the inner surface of peripheral wall 206', whereas, as a variation between the two embodiments, platform 122 of end cap 110 is instead held to base or cover 234 by a plurality of screws 228 that are inserted through holes 238 in platform 122 and that screwingly engaged with bores 230 of raised posts 232 that extend from the base or cover 234. It shall be understood that the manner of fastening of the platform to the base or cover of each end cap has many variations, and that glue or welding or the like may equivalently be used.

Embodiments 110, 110', and 112 all have many common structural features, and end cap 110 will be used to explain these structural features, it being understood that common structure performs similar functions in all embodiments of the end caps, so exploded perspective views FIGS. 14 and 15 are used to show some features common to the end caps, while FIGS. 16-19 are used to show other features.

As heretofore explained, the end cap 110', 110 of container 100 has a platform 122, a base or cover 234, and also has a rotatable cam 240 that can be rotated counterclockwise and clockwise about a central axis 242 upon post 244 of platform 122 as a user grips the cam 240 by upstanding radial ridges 246.

Each end cap has a plurality, preferably four, radially reciprocating pins 248 angularly spaced about the end cap for insertion into a like plurality of holes 250 proximate the top edge 204 and bottom edge 202 of the sidewall sheet 106, as best seen in FIGS. 11 and 22. A like plurality of angularly-spaced radially-extending camming surfaces 252 are provided about the circumference of cam 240 (see FIGS. 10, 14, 15, and 18) that respectively engage the plurality of pins 248 within each end cap, and cam 240 with camming surfaces 252 is thus seen to comprise camming means 253 for causing pins 248 to radially reciprocate within their respective end caps as cam 240 is rotated clockwise and counter-clockwise. Each pin 248 has a compression spring 254 therearound that is entrapped within a chamber 256, with one end of each compression spring 254 resting against the inner surface of peripheral wall 206 (or 206', for the alternate embodiment end cap), and with the other end of each compression spring 254 pressing against a laterally-extending transverse flange 258 of its respective pin 248, thereby biasing pin 248 radially inward. Each camming surface 252 has a detent portion 260 against which its respective pin 248 rests so as to tend to hold cam 240 stationary with pins 248 in the radially-extended position while container 100 is in transit.

Figure 19:
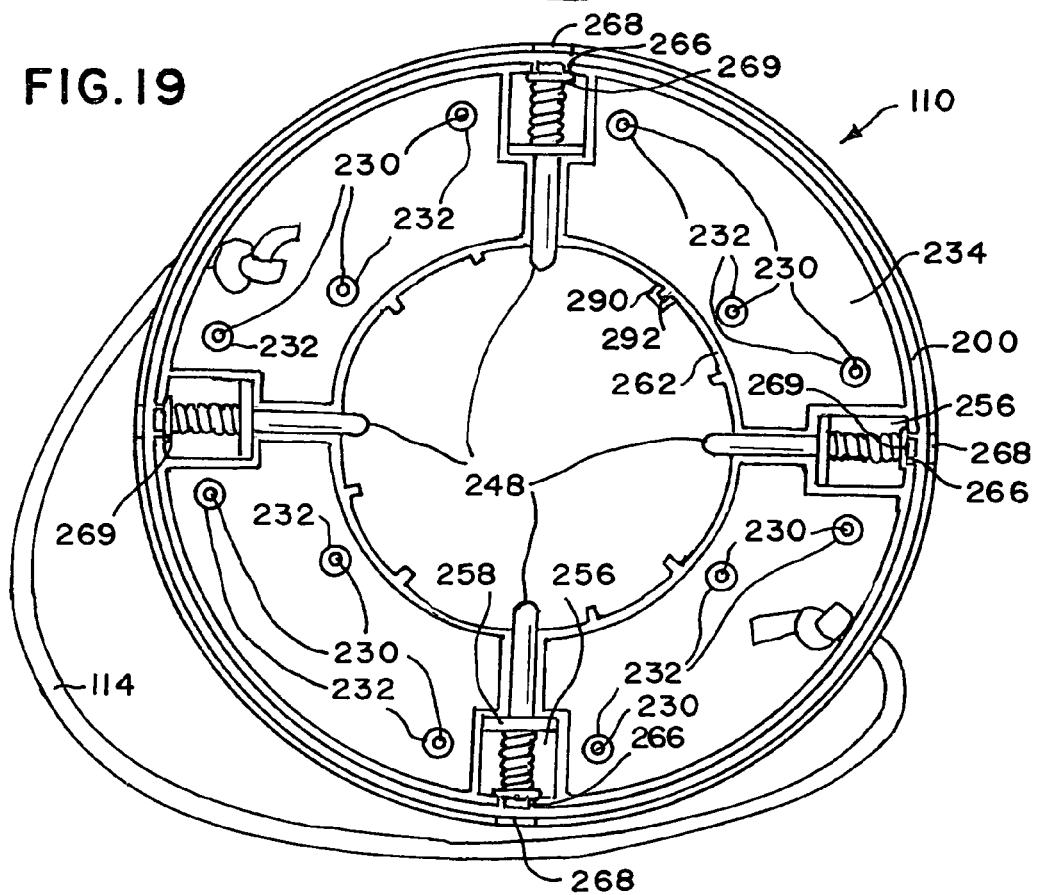
Figure 24:
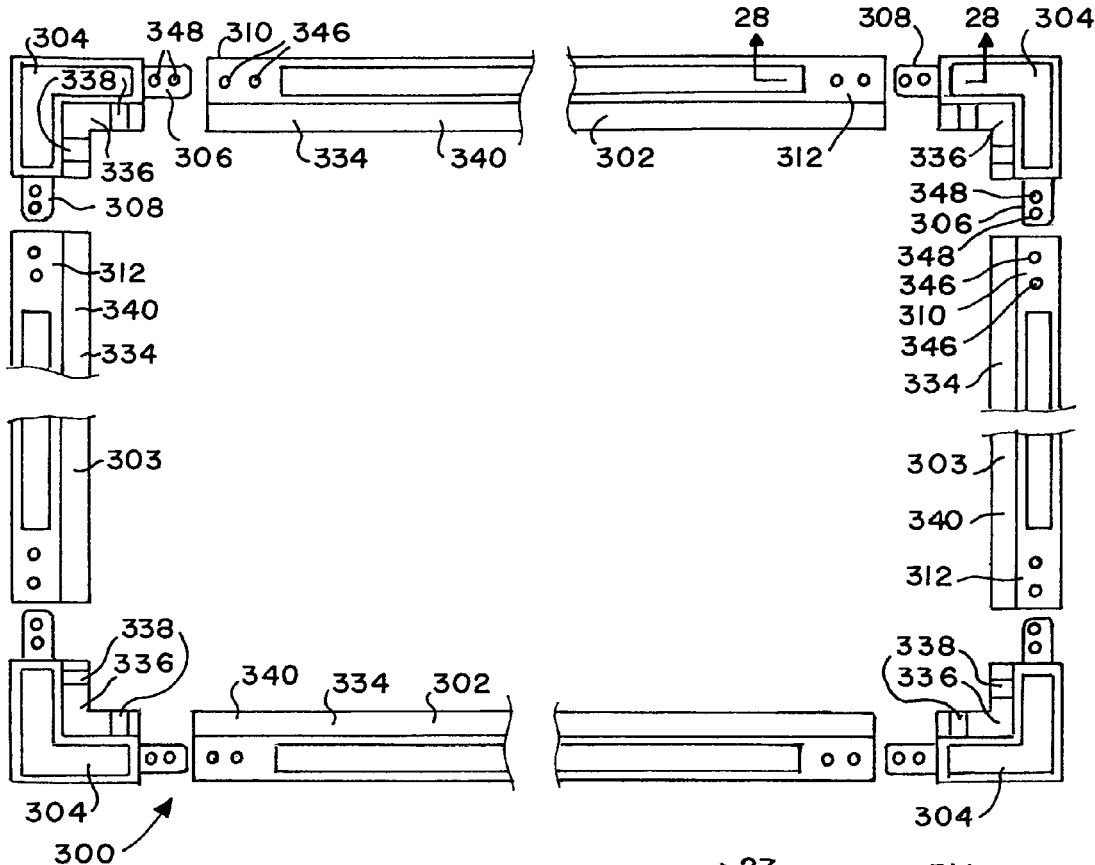
FIG. 24 is a rear view of the frame kit shown in FIG. 22 before assembly.

Base or cover 234 also includes an inner wall 262 defining a generally-circular central opening 264 into which cam 240 is received, and each pin 248 extends through aligned inner and outer holes 266, 268 (seen best in FIG. 19) on either side of circumferential channel 200, and a washer 269 may be provided at one end of spring 254 to prevent spring 254 from passing through hole 266, as seen best in FIG. 19.

Upon assembly, the cam 240 is inserted in the central opening 264 and rotatingly moved from a first, open position to a second, closed position. This movement causes the camming surfaces 252 of the cam 240 to push against the spring loaded pins 248. This radially-reciprocating outward movement of pins 248 allows the pins 248 to engage holes 250 (see FIG. 11) located in sidewall sheet 106 of the container 100 while the sidewall sheet 106 is disposed within channel 200. Once the cam 240 is locked in the second position, with pins 248 resting in detent portions 260 of camming surfaces 252, the pins 248 may further extend through outer holes 268 located on the peripheral wall 206 of the cover 234. By engaging the holes 250 in the sidewall sheet 106 and outer holes 268 through the peripheral wall 206, the end caps 110 secure the sidewall sheet 106 in a rolled or tubular shape, and provide a rigid and durable container 100.

Figure 10:
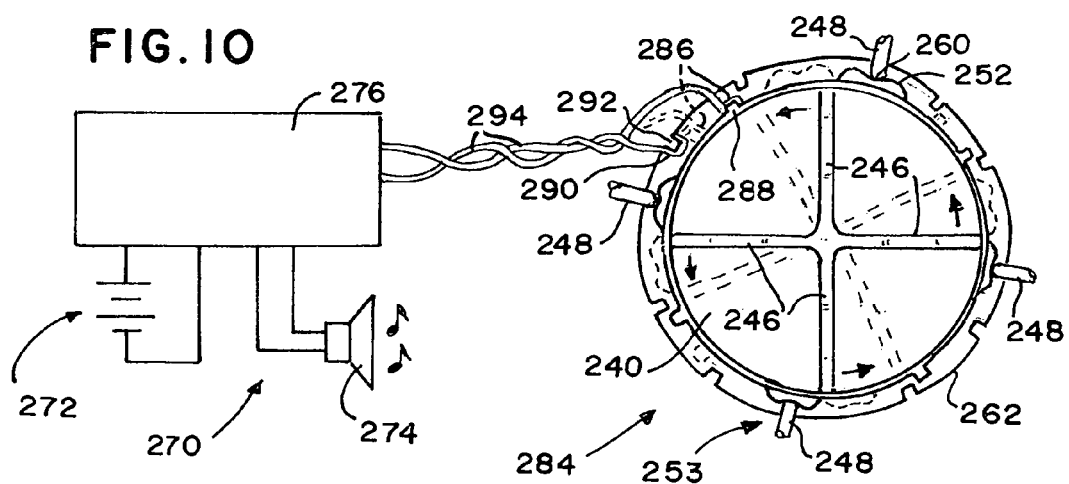
FIG. 10 is a schematic diagram showing interconnection and operation of the sound-playing means of the present invention.
Figure 17:
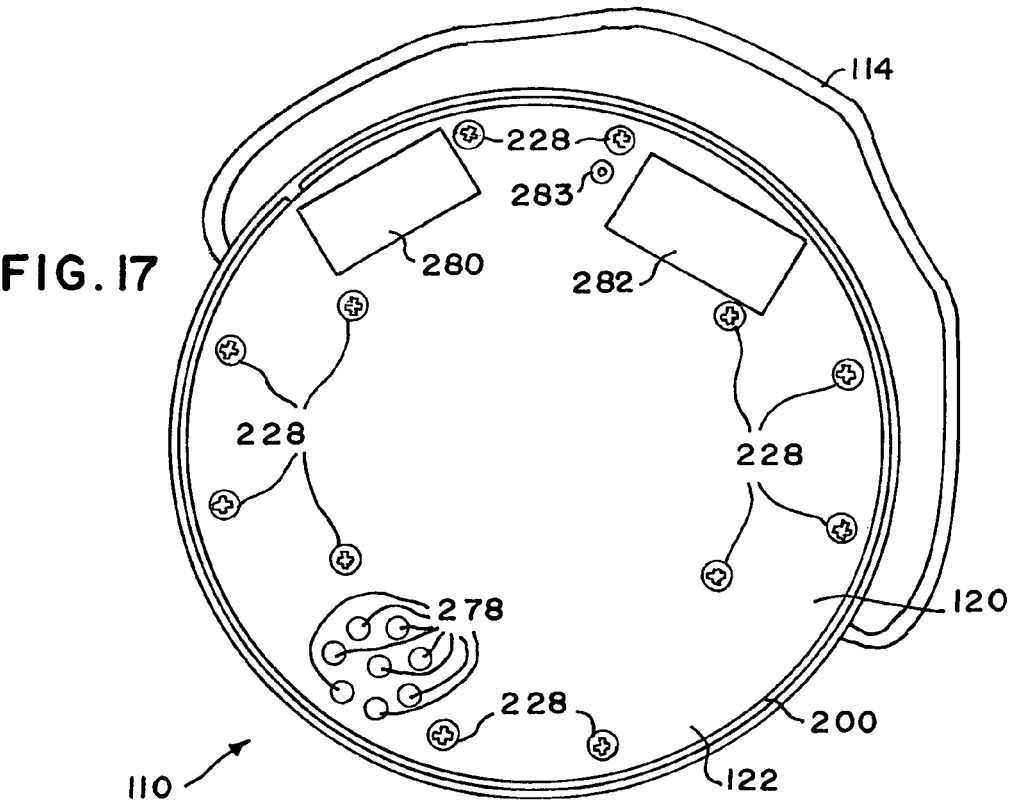
Figure 18:
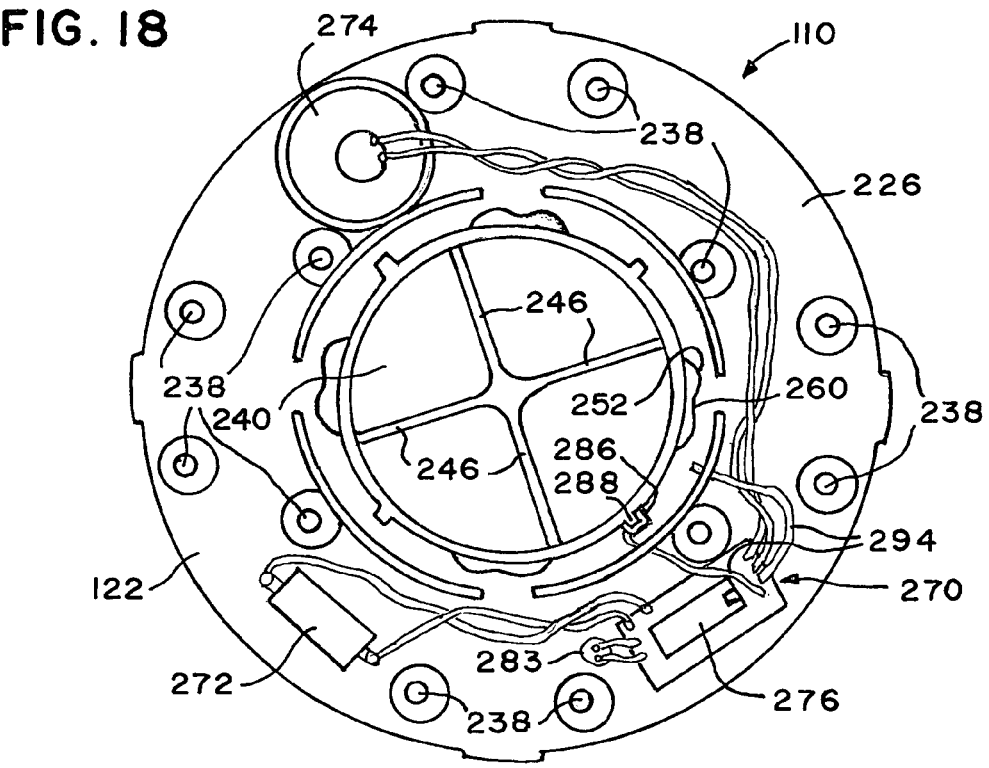

As best seen in FIGS. 10, 17, and 18, one of top and bottom end caps 110, 112 may preferably include sound-playing means 270, actuated by camming means 253, for playing a sound when camming means 253 is rotated so as to reciprocate its pins radially inward, thereby providing a greeting or music selected or recorded by the sender of the container 100 to the recipient of the container 100 when the container is opened by the recipient. Sound-playing means 270 includes a power source such as a battery 272, a speaker 274, and a well-known circuit 276 for storing the greeting or music and for playing that greeting or music through speaker 274. Many suitable well-known circuits 276 may be used with the current invention to provide sound-playing means 270, such as, for example, those disclosed in Turner et al., U.S. Pat. No. 6,718,013 (issued Apr. 6, 2004), and Goetcheus et al., U.S. Pat. No. 5,444,767 (issued Aug. 22, 1995), both fully incorporated herein by reference, and circuit 276 preferably includes a well-known programmable memory for holding the greeting or music selected and/or recorded by the sender of the container. A plurality of holes or openings 278 are provided through platform 122 in alignment with the mounting of speaker 274 thereupon to allow escape of sound from speaker 274. Platform 122 is preferably provided with a covered first window or access opening 280 with for inserting/replacing battery 272, and is also preferably provided with a second covered window or access opening 282 for inserting circuit 276 after it has been programmed with the music or greeting selected by the sender of the container. Alternatively, or also, a well-known interface connector or jack 283 may be provided, with interconnection to circuit 276, for programming of circuit 276 by inserting an appropriate well-known connecting cable from a computer into interface connector or jack 283 while circuit 276 is installed into the end cap, without requiring removal of circuit 276 to program the selected music or greeting.

Additionally provided for sound-playing means 270 is actuating means 284 for actuation of sound-playing means 270 as camming means 253 is rotated to open container 100. In the preferred embodiment of actuating means 284, a first contact 286 is provided on one of the rotational stops 288 of cam 240, and a second contact 290 is provided on a respective rotational stop 292 of inner wall 262 of cover 234 of the end cap, such that the mutual opening/closing of contacts 286, 290 as cam 240 is rotated causes actuation of circuit 276 in a well-known manner through the wires 294 that connect contacts 286, 290 to circuit 276.

Referring now to FIGS. 22-34, the container 100 of the present invention preferably includes a frame kit 300 having a plurality of side pieces 302, 303 and a plurality of corner pieces 304, with all corner pieces 304 preferably being substantially the same, each corner piece 304 having a first leg 306 and a second leg 308, and each side piece having a first end 310 and a second end 312. Each first leg 306 of each corner piece 304 is adapted for male-female engagement with one first end 310 of one of the plurality of side pieces 302, 303 and each second leg 308 of each corner piece 304 is adapted for male-female engagement with one second end 312 of another of the side pieces 302, 303, with each side piece 302, 303 being substantially, and preferably completely, non-abutting with each other side piece 302, 303 when the frame 314 is assembled from the frame kit 300. Although the embodiments shown in FIGS. 22-34 are rectangular with four sides and ninety-degree corners, it shall be understood that the frame kit of the present invention is readily applicable to non-rectangular frames and even to frames with three, five, and more sides simply by choosing appropriate lengths for the side pieces and appropriate angles for the corner pieces as required and as will now be apparent to those skilled in the art. Top and bottom side pieces 302 are substantially identical, and left and right side pieces 303 are substantially identical. Furthermore, the only substantial difference between side pieces 302 and side pieces 303 is that side pieces 302 are shown somewhat longer than side pieces 303, allowing the creation of a rectangular frame. Therefore, it shall be understood that a description of any one of the side pieces 302, 303 will suffice for all. However, it should be understood that the length of side pieces 302 may be the same as the length of side pieces 303 if desired and without departing from the spirit and scope of the present invention.

Frame kit 300 preferably further includes a rollable flexible sheet 106 that also serves as the sidewall sheet 106 of container 100 (see FIGS. 1-3 and 11-13). FIG. 22 is a front view of an unrolled sidewall sheet 106 with individual pieces of the optional frame kit 300 along the perimeter of the sidewall sheet 106, and FIG. 23 is a front view of the sidewall sheet 106 secured within the optional frame kit 300. The frame kit 300 allows a recipient to preserve and prominently display the personalized sidewall sheet 106 within a pleasing frame 314. In some cases, the recipient may choose to not use the frame kit 300 and simply use the sidewall sheet 106 as a placemat. With the exception of sheet 106, which preferably is flexible so that it may be rolled as heretofore described to form the sidewall of container 100, the individual pieces of the frame kit 300 may be fabricated from an injection molding process and be comprised of a rigid, durable material such as ABS or other plastic or polymer. When frame kit 300 is assembled into frame 314, side pieces 302, 303 and corner pieces 304 overlap the edges of sheet 106 so as to hide holes 250, and side pieces 302, 303 entrappingly hold sheet 106 when frame 314 is assembled, with sheet 106 spanning frame 314, as by having a plurality of frame fasteners 316 being inserted into side pieces 302, 303 and corner pieces 304 in a manner that will now be described.

Frame fasteners 316 are all substantially identical, with twice the number of frame fasteners 316 being provided as the number of corner pieces 304 and with the frame fasteners being flipped and translated so that each frame fastener 316 joins a corner piece 304 to one end of a side piece 302, 303 as shown. Each frame fastener 316 is substantially planar and has a plurality of laterally-extending tabs 318, 320, with each tab 320 preferably comprising a pair of resilient splayed legs 322, each leg 322 having an engaging catch 324 formed thereon. Each corner piece 304 and side piece 302, 303 is provided with a plurality of openings 326 that are adapted for close-mating engaging receipt of tabs 318, 320, with the catch 324 engaging the sides of its respective opening 326 so as to retain frame fastener 316 within its side piece 302, 303. Each frame fastener 316 preferably has a plurality of oval transverse holes 328, each hole 328 preferably having a beveled edge 330 on either opposing side of fastener 316 (see FIGS. 31 and 27) to enable an assembler-recipient of the frame kit 300 to more easily grip and remove fastener 316, after previous joining insertion of fastener 316 into its corner piece 304 and side piece 302 or 303, by inserting a finger or fingernail into holes 328 and pulling the fastener 316 toward the center of the frame 314.

To assemble the frame 314, the legs 306, 308 of each corner piece 304 are fully inserted into closely-receiving mating openings 332 in adjoining side pieces 302, 303 so that a side piece 302, 303 abuts each side of corner piece 304, sheet 106 is unrolled into the partially-assembled frame from the back with the desired personalized message, image, and/or graphic 210 facing the front of the frame 314, and then frame fasteners 316 are inserted into the side pieces 302, 303 and corner pieces 304 as heretofore described so as to sandwichingly entrap the sheet 106 between, on the one hand, the frame fasteners 316 and, on the other hand, the front lips 334, 336 of side pieces 302, 303 and corner pieces 304. It should be noted that lips 334, 336 also hide holes 250 from front-side viewing of sheet 106, and raised ledges 338 may be provided in front of each opening 326, or, alternatively and also, the entire rearward-facing portion 340 of lips 334 may be raised to engage the front of sheet 106, so as to better enable fasteners 316 to entrappingly hold sheet 106 to the side pieces 302, 303 and corner pieces 304 of frame 314.

Figure 32:
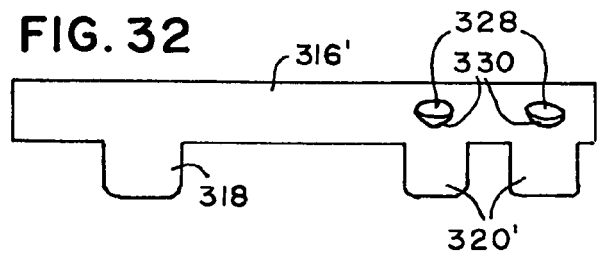
FIG. 32 is a plan view of an alternate embodiment of the frame fastener shown in FIG. 31.

An alternate embodiment 316' of the frame fastener is shown in FIG. 32, whose only difference from fastener 316 is that the tabs 320' do not have splayed legs as does fastener 316. The structure of fastener 316 is preferred because it better holds the frame together in a rigid manner after assembly.

Figure 29:
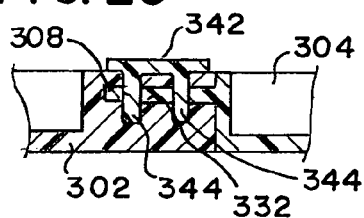
FIG. 29 is a partial sectional view of the frame kit after assembly, taken substantially along the line 29-29 shown in FIG. 25, showing the use of an optional frame corner joiner.
Figure 30:
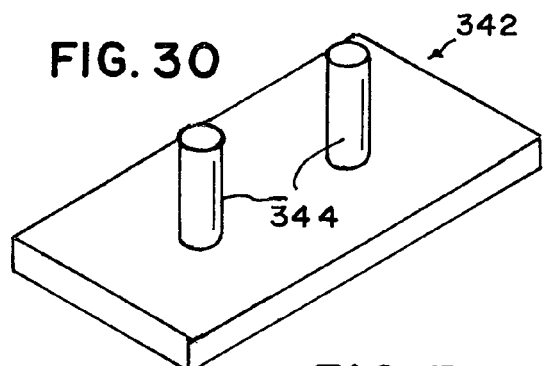
FIG. 30 is a perspective view of an optional frame corner joiner of the present invention.
Figure 31:
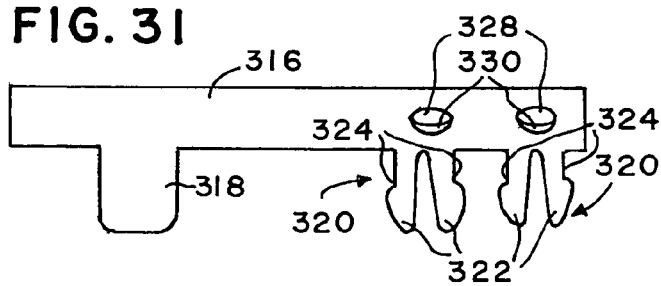
FIG. 31 is a plan view of a frame fastener of the present invention.

If desired, a plurality of optional frame corner joiners 342 may be provided as seen best in FIG. 30, and each joiner 342 has a pair of upstanding pins 344 for engagement with aligned closely-receiving holes 346, 348 of side pieces 302, 303 and legs 306, 308 of corner pieces 304 as best seen in FIG. 29 so as to better stabilize and make more rigid the abutting joints between each corner piece 304 and its adjacent side pieces 302, 303. It has been found, though, that frame fasteners 316 provide sufficient stability and rigidity of assembled frame 314 without use of frame corner joiners 342.

Figure 25:
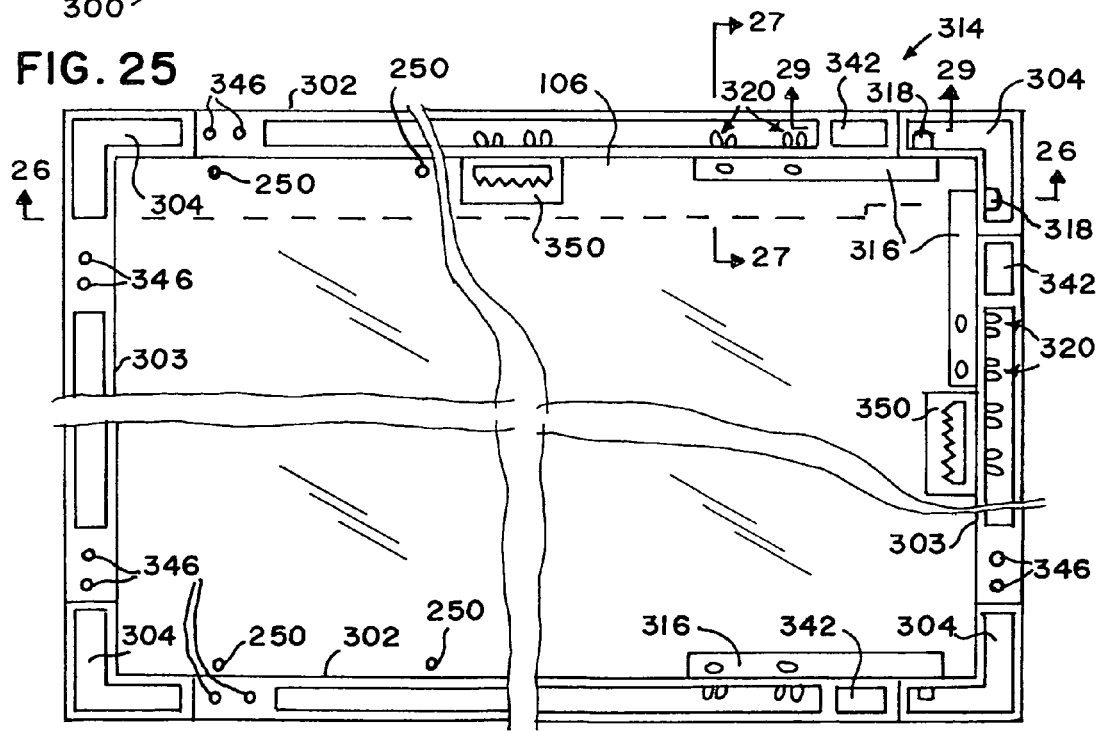
FIG. 25 is a rear view of the frame kit shown in FIG. 23 during assembly.
Figure 26:
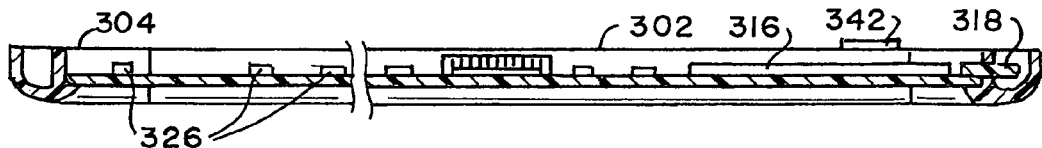
FIG. 26 is a partial sectional view of the frame kit during assembly, taken substantially along the line 26-26 shown in FIG. 25.
Figure 27:
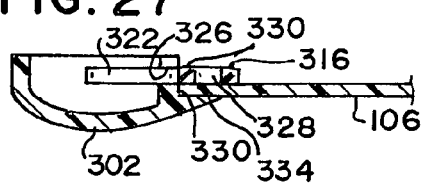
FIG. 27 is a partial sectional view of the frame kit after assembly, taken substantially along the line 27-27 shown in FIG. 25.
Figure 28:
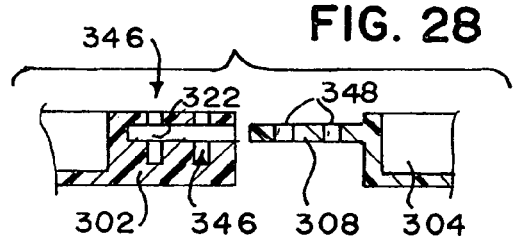
FIG. 28 is a partial sectional view of the frame kit before assembly, taken substantially along the line 28-28 shown in FIG. 24.
Figure 33:
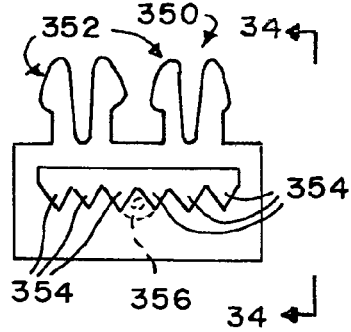
FIG. 33 is a plan view of a frame hanger of the present invention, with a nail shown in dotted outline.
Figure 34:
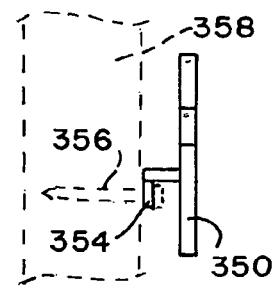
FIG. 34 is a side view of the frame hanger shown in FIG. 33, taken substantially along the line 34-34 shown in FIG. 33, with a nail and wall shown in dotted outline.

Frame kit 300 preferably also includes a frame hanger 350 as seen best in FIGS. 33 and 34. Like frame fastener 316, frame hanger 350 has a plurality of tabs 352 substantially identical to tabs 320 of frame fastener 316, and frame hanger 350 is inserted into a central portion of a side piece 302 or 303 as shown in FIG. 25, with frame hanger 350 being centrally inserted into side piece 302 if frame 314 is to be hung in landscape mode, and with frame hanger 350 being centrally inserted into side piece 303 if frame 314 to be hung in portrait mode. Hanger 350 has a plurality of downwardly-depending teeth 354 for engaging a nail 356 that has been nailed into a wall 358, thereby supporting frame 314 upon wall 358 for display.

FIG. 35 presents an overview of a method 900 of processing an order for shipment of a gift or promotional product in a container 100 as hereinbefore disclosed, where the container's contents, in addition to a ordered gift or promotional product, also includes a frame kit 300 as hereinbefore disclosed, with the sidewall 106 of the container being personalized for subsequent assembly with the frame kit upon receipt of the container by the recipient. It should be understood that container 100 may preferably also include sound playing means as hereinbefore disclosed.

While a preferred embodiment of the method 900 may include as the shipped product the floral stand of the present invention as hereinbefore disclosed, it should be understood that other gift or promotional products may instead or also be provided, such as, simply for example, stuffed animals, chocolates, jewelry, novelty items, and other gifts and/or promotional items, whose scope is limited only by the size chosen for container 100.

In a preferred embodiment, whereby fresh flowers are shipped in a floral stand within the container, the entire process, including the growing and harvesting of the flowers, as well as the assembly, packaging and placement within the shipping channel, may be owned and operated by one party (referred to as the "seller"). The order is preferably not received and then transmitted to a third party. In one embodiment, the entire process may be governed by fair-trade practices with all of the seller's employees registered under a variety of internationally recognized fair trade labels. As used herein, the term "fair trade" refers to an organized social movement that promotes equitable standards for international labor, environmentalism, and social policy.

In the illustrated embodiment, the step designated 910 includes collection, treatment, packaging and shipment of the contents of the container 100 to a logistics hub. As an example, in an embodiment where the gift product or promotional item is to include cut flowers in the floral stand of the present invention, collection of flowers by the seller may begin each morning with the last pick in the afternoon of the time zone of the seller's flower farm. In one embodiment, the seller's farm is located in Kenya. These flowers may then be specially treated and processed to meet the market conditions of the flower's final destination. This process may include adherence to a strict cold chain management profile and specific packing and grading. For floral orders whose final destination is the United States, flowers are shipped, inclusive of stops or layovers, to a central logistics hub in the United States for unpacking and further processing. In one embodiment, the hub is Memphis, Tenn. In the step designated 920, the contents for the container 100 are received and stored at a logistics hub. In an embodiment where the gift or promotional product is to include cut flowers, the flowers may be unpacked, re-hydrated and stored at the logistics hub based on a last in, first out stocking method.

In a preferred embodiment, the ordering process is initiated when a consumer logs into an internet web portal by visiting any number of internet domains owned by or affiliated with the seller as illustrated in step 930. Through the web portal, having a well-known so-called "shopping cart" paradigm, the customer is informed about fair-trade practices and may be given the opportunity to order a variety of gifts, including bouquets of flowers. In an alternative embodiment, the consumer may dial a seller's call center to speak with a customer service representative as represented in step 940. The customer may select from a library of container sidewall sheets that are pre-printed with messages, images or a combination thereof to match a special occasion such as a birthday, anniversary, or graduation as illustrated at step 950, and/or the customer may upload customer-provided clip art, images, photographs, graphics, and the like. The sidewall 106 is then personalized by the customer, whether personally by the customer or by interaction with and with assistance by a customer service representative, and the resulting artwork is then saved on a central computer together with information identifying the customer and the order. Furthermore, individuals and corporate entities may register with the seller and build libraries of sidewall sheets that can be selected for next-day shipment. In one embodiment, the customer may choose to customize his or her sidewall sheet by including special messages, artwork or a combination thereof. In yet another embodiment, graphic artists employed by the seller may develop special artwork upon request and provide drafts of the sidewall sheet for customer approval before shipping. It is thus understood that step 950 of method 900 may include personalizing or specifying an image to be presented upon the sidewall sheet 106.

Likewise, the customer can create or select a personalized greeting, sound file, or audio recording to be programmed into the sound-playing means of container 100. For example, the customer may upload an audio file from the customer's computer or upload a pre-recorded message or greeting that the customer has created, or the customer may select a sound file from a library of music, pre-recorded greetings, and/or sounds stored on the internet web site. Alternatively, the customer may make a telephone call to a provided telephone number and leave or record a greeting message that will be programmed in to the sound-playing means of container 100. It is thus understood that step 950 of method 900 may further include the step of specifying a sound to be programmed into the sound-playing means of the container.

Once a customer places the order through the web portal or via telephone, a response may be generated by the seller's response or call center, thus alerting the seller's logistics staff about the order, as well as alerting the seller's graphics staff of the possible need to generate a specific sidewall sheet (step 960). In one embodiment, pre-printed standard sidewall sheets and container parts may be shipped periodically to the logistics hub to maintain a consistent inventory. In the case of an order for a sidewall sheet having thereon a personalized message, graphics or combination thereof, the seller's graphics staff may prepare the sidewall sheet according to the consumer's specifications and ship the sidewall sheet to the logistics hub in time for assembly and shipment to the recipient within the promised time period as shown in step 970. In an alternative embodiment of the method, the seller's graphics team may print the personalized message, graphics or combination thereof on a film and ship the film to the logistics hub along with other gift products or promotional items such as, in some embodiments, the flowers for placement in a floral stand of the present invention.

Upon arrival at the logistics hub, the film is applied to previously shipped, pre-cut sidewall sheets. The film is fabricated from any light, flexible material capable of receiving ink or laser printing techniques. In one embodiment, the film is fabricated from a cellulose-based substrate. It should be understood that both sides of sidewall sheet 106 may be personalized or customized, and commercial entities may want to put a prominent trademark or brand image on the outside of the container (see FIG. 1) for promotional or branding purposes. Customer service representatives may be made available twenty-four hours per day, seven days a week, to assist with any complications in the order process via an online chat or toll free telephone call.

At the seller's logistics hub, the previously-stored container contents, whether fresh flowers inserted and arranged in a floral stand of the present invention, or other gift products and promotional items, and assembled for placement into the container 100 at the step designated 980. For example, in one embodiment of the method, the water bladder and frame kit may be assembled at the logistics hub with flowers in a floral stand of the present invention. Additionally, the sound-playing means may be programmed with the personalized greeting, message, or sound to be played to the recipient of the container when the container is opened. In the step designated 990, the container is then shipped via a common carrier such as Federal Express in order to arrive at its final destination within the promised time period, or, if the contents of container 100 are not perishable, pre-packaged containers may be shipped to another location for subsequent distribution. In a preferred embodiment, the amount of time between the consumer's order and arrival of the container at the recipient's home or place of business is twenty-four hours or less. Upon arrival, the recipient may unlock the container by turning the cam and thereby causing the personalized greeting or recorded sound to be played by the sound-playing means and also thus releasing the sidewall sheet and connector allowing the recipient to access the flowers, view the interior surface of the sidewall sheet and assemble the frame kit.

It should again be understood that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Although the present invention has been described and illustrated with respect to a preferred embodiment and a preferred use therefor, it is not to be so limited since modifications and changes can be made therein which are within the full intended scope of the invention.

I claim:

1. A floral stand, said floral stand including a frustoconical bladder, said bladder comprising:
    an inner wall and an outer frusto-conical wall spaced from said inner wall; said inner wall being sealed to said outer wall at an upper portion of said bladder by a first annulus and said inner wall being sealed to said outer wall at a lower portion of said bladder by a second annulus; said inner wall surrounding a volume therewithin;
    said bladder having a first hole therethrough proximate said lower portion of said bladder;
    said floral stand having an elongated member extending from above said floral stand and removably sealing said first hole;
    said floral stand having a plurality of spaced-apart fingers proximate said upper portion of said bladder and extending upwardly therefrom.

2. The floral stand as recited in claim 1, in which said first hole has a first grommet received therein, said elongated member being removably inserted into said first hole with said first grommet being intermediate said elongated member and said bladder and sealing said elongated member to said bladder.

3. The floral stand as recited in claim 2, in which said inner wall, said outer wall, said first annulus, and said second annulus of said bladder enclose a bladder interior, said bladder interior being filled with a liquid that is released through said first hole upon removal of said elongated member from said first hole.

4. The floral stand as recited in claim 1, in which said inner wall, said outer wall, said first annulus, and said second annulus of said bladder enclose a bladder interior, said bladder interior being filled with a liquid that is released through said first hole upon removal of said elongated member from said first hole.

5. The floral stand as recited in claim 1, in which said fingers extend upwardly from a frusto-conical shell received onto said bladder adjacent said outer wall.

* * * * *